United States Patent Office 3,427,300
Patented Feb. 11, 1969

3,427,300
ANTI-INFLAMMATORY STEROID 2'-ACETAMIDO-2'-DEOXY-GLUCOSIDE COMPOUNDS
Lewis H. Sarett, Princeton, Robert G. Strachan, North Plainfield, and Ralph F. Hirschmann, Scotch Plains, N.J., assignors to Merck & Co., Inc., Rahway, N.J., a corporation of New Jersey
No Drawing. Continuation-in-part of application Ser. No. 402,015, Oct. 6, 1964. This application Nov. 12, 1965, Ser. No. 507,522
U.S. Cl. 260—210
Int. Cl. A61k *17/06;* C07c *169/26*

21 Claims

ABSTRACT OF THE DISCLOSURE

The invention disclosed herein is concerned generally with novel derivatives of hydroxylated anti-inflammatory compounds. More particularly, it is concerned with 2'-(amino or acylamido)-2'-deoxy-glucosides and 2'-(a-mino or acylamido)-2'-deoxy-galactosides of the following hydroxylated anti-inflammatory compounds: Ring A unsaturated 11,17 - bis - oxygenated - 20 - keto - (16 - hydroxy and/or 21-hydroxy)-steroids of the anti-inflammatory pregnane series; hydroxy-butazolidine; salicyclic acid, its esters, its amide and its N-alkyl and N,N-dialkyl derivatives, and phenyl substitution products thereof. This invention includes within its scope the novel process, and the new intermediate compounds therein, in which a 2' - substituted - 3,4,6 - tri - O - acetyl - 1 - halo-2-deoxy-α-D-(glucoside or galactoside) is reacted with an alkali metal derivative of the hydroxylated anti-inflammatory compound, and the resulting product reacted with aqueous alkali thereby hydrolyzing the O-acetyl groupings to form the corresponding 2'-substituted-2'-deoxy-(glucoside or galactoside) of said hydroxylated anti-inflammatory compound. Pharmaceutical compositions containing the novel compounds of the invention as an active ingredient are also within the purview of the invention.

---

This is a continuation-in-part of application Ser. No. 402,015, filed Oct. 6, 1964, now U.S. Patent No. 3,325,474 which, in turn, is a continuation-in-part of application Ser. No. 259,384, filed Feb. 18, 1963, and now abandoned.

Amongst the hydroxylated compounds which may be employed for the production of the therapeutically active products of this invention, those of special interest include hydroxy-butazolidine, salicyclic acid and therapeutically active analogs thereof, and Ring A unsaturated 11,17-bis-oxygenated-20-keto steroids of the anti-inflammatory pregnane series, especially 21-hydroxy derivatives. These glycoside products comprising reaction products of hydroxylated anti-inflammatory compounds and selected glucose and galactose derivatives possess the therapeutic activity characteristic of the parent compounds such as the anti-inflammatory activity of hydroxy-butazolidine, cortisone, hydrocortisone and their 1,2-dehydro derivatives, prednisone and prednisolone or the analgesic and anti-inflammatory activity of salicyclic acid. The steroid derivatives are remarkably free from the ulerogenic action, adrenal atrophy, thymus involution and body weight loss side-effects which have often resulted from prolonged administration of the aforementioned anti-inflammatory steroids. All of the compounds of this invention are especially interesting because of their delayed absorption and resulting prolonged effect on oral administration.

The physiologically active compounds within the scope of this invention include, for example, compounds which may be represented by the formulas:

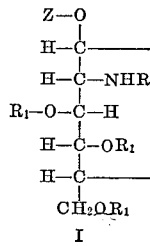  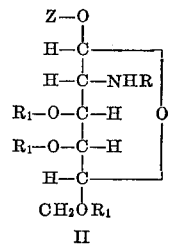

wherein:

Z is a radical formed by removal of the hydroxyl group from:
(1) Hydroxybutazolidine [4 - butyl - 1 (4 - hydroxyphenyl)-2-phenyl-3,5-pyrazolidinedione-1,2];
(2) Salicyclic acid [ortho-carboxyphenol], an ester thereof, especially hydrocarbonoxy esters in which the hydrocarbonoxy group contains up to nine carbon atoms, more specifically methoxy, ethoxy, propoxy, isopropoxy, butoxy, phenoxy, naphthoxy, p-methylphenoxy, benzyloxy, β-phenethoxy, α-ethylbenzyloxy and like radicals; or salicylamide [ortho-carbamidophenol] an N-alkyl, or N,N-dialkyl derivative thereof, especially alkyl-amido derivatives in which an alkyl group contains up to five carbon atoms, more specifically α-methylamido, N-propylamido, N-pentylamido, N,N-dimethylamido and the like; and derivatives of said acid, esters and amides in which the phenyl group is substituted with a lower alkyl radical such as methyl or ethyl, a halogen atom, a lower alkoxy radical such as methoxy or ethoxy or an aralkoxy radical such as benzyloxy; or
(3) The radical formed by removal of a 16- or 21-hydroxyl group from the corresponding Ring A unsaturated 11,17-bis-oxygenated-20-keto-16- or 21-hydroxy steroid of the pregnane series.

R is hydrogen, an acyloxy group such as acetoxy propionoxy, butroxy and the like, trifluoroacetyl, or salicyloxy (ortho-hydroxy-carboxyphenyl) or derivatives thereof in which the phenyl group is substituted with a lower alkyl radical such as methyl or ethyl, a halogen atom, a lower alkoxy radical such as methoxy or ethoxy, or an aralkoxy radical such as benzyloxy; and
$R_1$ is hydrogen, acyloxy as defined above, or salicyloxy as defined above.

In the above formulas, Formula I represents glucoside derivatives. Compounds represented by Formula II are galactoside derivatives.

The preferred anti-inflammatory steroid compounds within the scope of this invention may be represented by the formulas:

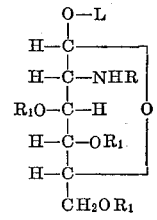  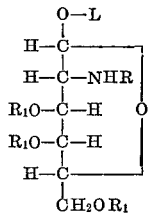

in which L is a radical formed by removal of a 16- or 21-hydroxyl group from the corresponding Ring A unsaturated 11,17-bis-oxygenated-20-keto-16- or 21-hydroxy steroids of the pregnane series; and R and $R_1$ are as defined above.

These preferred steroid compounds may be prepared by reacting the selected 16- or 21-steroid alcohol with a 2-lower alkanoylamido compound such as 2-acetamido-3,4,6-tri-O-acyl-1-halo-2 - deoxy-α-D-glucose, the corresponding galactose or a trifluoroacetamido analog of these compounds. The most convenient tri-acyl compounds are the O-triacetates and the reactions will generally be described using these compounds as models. The compounds will be referred to, for convenience, as 1-bromo-N-acetylglucosamine triacetate, 1-chloro-N-acetylglucosamine triacetate, 1-bromo-N-acetylgalactosamine triacetate and 1-chloro-N-acetylgalactosamine triacetate. The corresponding N-trifluoroacetamido compounds will be similarly named. The products formed by the reactions are 3′,4′,6′-triacetates namely steroid-16-yl or steroid-21-yl-3′,4′,6′-tri-O-acetyl-β-D-2′-acetamido-2′-deoxy glucosides and galactosides. The O-acetyl groups may then be removed by hydrolysis.

The reaction as applied to the preparation of glucosides may be represented by the following reaction sequence in which 1-chloro-n-acetylglucosamine triacetate is used as an illustrative starting compound

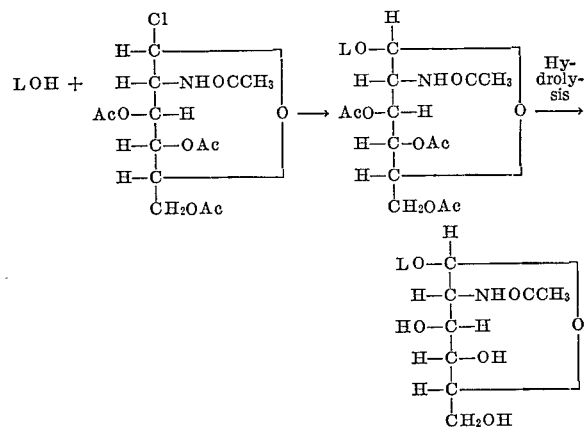

In the foregoing foregoing formulas L has the same meaning as above, and Ac is acetyl.

The O-triacetate derivatives are conveniently prepared by reacting the starting steroid with 1-chloro-N-acetylglucosamine triacetate, 1-chloro-N-acetylglucosamine triacetate, the corresponding bromo compounds or the N-trifluoroacetyl derivative of any of these four compounds in a reaction inert organic solvent or solvent mixture in the presence of a dehydrohalogenation promoting agent such mercuric cyanide or iodide, silver carbonate or an hydroxide or carbonate of an alkali metal, suitably potassium or sodium. Nitrogen or other inert atmosphere may be used to minimize side reactions. The reaction is carried out during a period of from about 15 minutes to about 4 hours at a temperature of from about 25° C. to about 140° C., most conveniently at the refluxing temperature of the selected solvent. Suitable solvents include oxygenated solvents, especially ketones such as acetone or methyl isopropyl ketone, or hydrocarbon solvents, especially hydrocarbon solvents such as benzene, toluene or xylene.

The bromo compounds listed above are the preferred reactants since they generally react under less rigorous conditions with respect to time and temperature than are required for the chloro compounds. Further, they generally result in higher yields since there is less tendency to rearrange to oxazolines and oxazolidines under the reaction conditions.

The N-trifluoroacetyl compounds are more versatile starting reagents since the trifluoroacetyl group is more readily hydrolyzed than the acetyl group. This is important if it is desired to obtain a free amino compound either for direct use or for conversion to another derivative, for example the salicylamido derivative.

For the preparation of N-acylamido compounds or N-trifluoroacetylamido compounds only the O-acyl groups need be removed. Such selective hydrolysis is effected under mildly alkaline conditions utilizing an alkali metal lower alkoxide in a lower alkanol. Sodium methoxide in methanol is especialy convenient although other combinations in which the alkanol may contain, for example, up to four carbon atoms may be employed. The reaction is conveniently carried out by mixing the reagents at room temperature, i.e. about 20° C. to 40° C. and allowing them to stand for from about five minutes to about one hour. The product is isolated by any convenient method. For example, the mixture can be adjusted to neutrality with a lower alkanoic acid followed by the addition of water and cooling. The product, which separates on cooling, is usually crystalline and is recovered by filtration.

For the preparation of amino compounds, it is best to utilize trifluoroacetamido starting materials and to remove the N-trifluoroacetyl group and the O-acyl groups simultaneously by hydrolysis in the presence of a stronger base such as an alkali metal hydroxide. The reaction conditions are similar to those described above except that water is employed as the reaction medium, either alone or in association with a lower alkanol. Water-methanol or water-ethanol mixtures which may contain up to 95% alkanol are convenient. Sodium or potassium hydroxide are the preferred alkaline catalysts. The N-acylamido group is stable under these hydrolysis conditions. At the end of the reaction the base is neutralized by the addition of acid. Sufficient acid must be used to neutralize the basic hydrolysis catalyst. If desired, sufficient additional acid may be added to form an acid addition salt. It is specifically intendded to include such acid addition salts within the purview of this invention.

As an alternative to selective hydrolysis, all of the acyl groups can be removed and the highly active amino group on the resulting compound selectively acylated. Such selective acylation is conveniently carried out by reacting an equimolar portion of glycoside and an anhydride such as acetic, propionic, butyric, succinic or phthalic anhydride in a lower alkanol solvent such as methanol or ethanol at from about 20° C. to about 30° C. for from about one to about three hours in the presence of an equimolar quantity of a base, especially a tertiary nitrogenous base such as pyridine. For the preparation of a fully acylated derivative, at least four moles of anhydride per mole of glycoside are used under similar conditions, except that the reaction may be carried out at elevated temperature, e.g. 60° C. to 100° C.

It will be apparent from consideration of the foregoing reaction descriptions that a variety of compounds may be prepared by selection of the proper reaction sequence. Thus, there may be prepared steroidal glycosides in which:

(1) Both N-acyl and tri-O-acyl groups are present.
(2) An N-acyl group is present but all O-acyl groups are removed.
(3) Both N-acyl and O-acyl groups are removed.
(4) An N-trifluoroacetoamido groups is present together with three O-acyl groups.

Compounds in which the O-acyl groups are removed are especially interesting. The free hydroxyl groups generated by removal of the acyl groups are available for reaction with salicyloyl chloride or analagous compound to form trisalicylates. In the event the amino group is also free, tetrasalicylates can be prepared. It is thus possible to combine within the one molecule the salutary therapeutic effects of both the steroid and salicylic acid.

In the presently preferred procedure for the preparation of these tri- and tetrasalicylates the glycoside is reacted with a salicyloyl halide such as the chloride in which the hydroxyl group is protected, for example by acylation. The reaction is carried out in the presence of a basic reagent. It may be carried out in excess pyridine which serves as both the solvent and the base. It is most conveniently carried out at room temperature, although somewhat higher or lower temperatures may be used without adverse effect. The reaction period is from about 10 to 20 hours. At least an equimolar portion of the acid halide will ordinarily be employed, i.e. 3 equivalents of acid halide for the trisalicylate and 4 equivalents for the tetrasalicylate. An excess of as much as 50% may be used to insure as complete a reaction as possible.

In accordance with these procedures there are obtained a variety of steroidal glucosides and galactosides compounds which include the preferred Ring A unsaturated 11,17-bis-oxygenated-21-hydroxy-20-keto pregnanes of the anti-inflammatory pregnane series: cortisone, hydrocortisone, and the 1,2-dehydro derivatives thereof, prednisone and prednisolone; 6,7-dehydro and/or 16-hydroxy derivatives (including acetonides) of any of the foregoing; derivatives of any of these compounds having fluoro, chloro, or bromo substituents attached to the 6, 9, 12 and/or 16-carbon atoms, and/or methyl substituents attached to the 2, 6, 12, 15 and/or 16-carbon atoms; and the like. Of particular interest are the derivatibes of 16-methyl cortisone, hydrocortisone, prednisone, prednisolone and their 9α-fluoro analogs, especially the 6,16-dimethyl compounds and their 6,7-dehydro derivatives and the [3,2-C] pyrazolo derivatives of these compounds.

The reactions which have been described above in connection with the preparation of steroidal glycosides of this invention are similarly applicable to the preparation of hydroxybutazolidine compounds within the scope of the invention.

Reference has previously been made to 1-bromo-N-trifluoroacetyl-galactosamine triacylates. These novel compounds are prepared by reaction of the triacylated glucosamine or galactosamine with a trifluoroacetylating agent. Although trifluoroacetic acid or the corresponding acid halides, e.g. bromide or chloride can be used, it is preferred to use trifluoroacetic anhydride for ease of manipulation and because of the yields which may be obtained. The reaction is most conveniently carried out at room temperature by mixing the reactants and allowing them to stand for from about six to about sixteen hours. A reaction inert organic solvent, especially hydrocarbon or halogenated hydrocarbon solvents containing, for example, up to eight carbon atoms such as methylene chloride, ethylene chloride or iso-octane can be used, if desired. If the reaction is carried out under pressure a higher temperature can be used. It is preferred to protect the reaction mixture from moisture to minimize side reactions. An inert atmosphere such as nitrogen can be used, but it is not necessary to do so. At least an equimolar quantity of trifluoroacetylating agent is normally employed, but an excess which may be as high as a 50% molar excess may be used to insure as complete a reaction as possible. Since the hydroxyl groups on the glycoside moiety are protected by acylation they do not interfere appreciably with the trifluoroacetylation.

The novel salicylic acid compounds within the scope of this invention may be represented by the formulas:

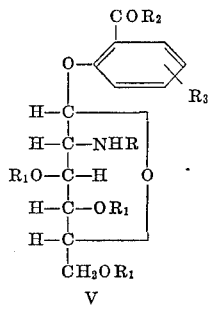
V

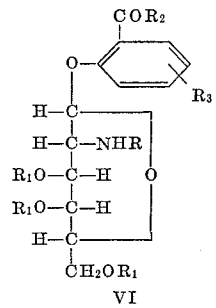
VI wherein R and $R_1$ are as defined above; $R_2$ is hydroxyl, hydrocarbonoxy containing, for example, up to nine carbon atoms including alkoxy, aryloxy or aralkoxy groups, more specifically methoxy, ethoxy, propoxy, isopropoxy, butoxy, tert.-butoxy, phenoxy, napthoxy, p-methylphenoxy, benzyloxy, β-phenylethoxy, α-ethylbenzyloxy, and the like or an amido, N-alkylamido, N,N-dialkylamido radical in which an alkyl group contains up to five carbon atoms more specifically N-methylamido, N-propylamido, N-pentylamido, N,N-dimethylamido and the like; and $R_3$ is hydrogen, or a lower radical such as methyl or ethyl, a halogen atom, a lower alkoxy radical such as methoxy or ethoxy, or an aralkoxy radical such as benzyloxy.

Compounds represented by Formula V are glucosides. Those represented by Formula VI are galactosides.

A typical compound within the scope of this invention may be represented by the formula:

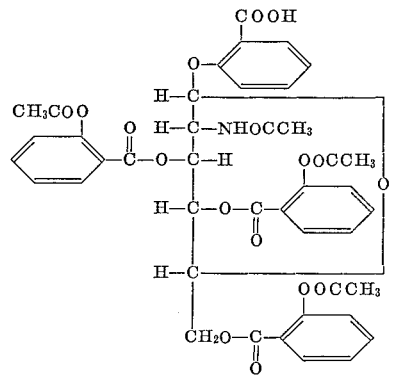

It will be seen that the salicylic acid moiety joined through the glycoside linkage is an ortho-carboxyphenyl group, and the salicylic acid moiety joined to the hydroxyl groups of the glucosamine segment is an ortho-acetoxybenzoyl group. Accordingly the compound may be named (ortho-carboxyphenyl)-2'-acetamido-2'-deoxy-3', 4',6'-tri-O-(ortho - acetoxybenzoyl)-β-D-glucoside. This system of nomenclature will be used throughout the specification.

The following compounds are illustrative of the therapeutically active salicylic acid derivatives within the scope of the invention.

(Ortho-carboxyphenyl)-2'-acetamido-2'-deoxy-3,4,6-tri-O-(ortho-acetoxybenzoyl)-β-D-glucoside
(Ortho-carbomethoxyphenyl)-2'-acetamido-2'-deoxy-3', 4',6'-tri-O-(ortho-propionyloxybenzoyl)-β-D-glucoside
(Ortho-carbamidophenyl)-2'-butyramido-2'-deoxy-3',4', 6'-tri-O-(ortho-acetoxybenzoyl)-β-D-galactoside
(Ortho-N,N-dimethylcarbamidophenyl)-2'-acetamido-2'-deoxy-3',4',6'-tri-O-(ortho-acetoxybenzoyl)-β-D-galactoside
(Ortho-carbopropoxyphenyl)-2'-amino-2'-deoxy3',4', 6'-tri-O-(ortho-acetoxybenzoyl)-β-D-glucoside
(Ortho-carbobutoxy)-2-amino-2'-deoxy-3',4',6'-tri-O-(ortho-acetoxybenzoyl)-β-D-galactoside hydrochlide In accordance with the presently preferred process for preparing the compounds of this invention a 2-lower alkanoylamido compound such as a 2-acetamido- or a 2-trifluoroacetamido-3,4,6-tri-O-acyl-1-halo - 2 - deoxy-α-D-glucoside or galactoside is reacted with a salicylic acid ester or its alkali metal salt. The latter may be prepared in situ. Exemplary compounds which may be employed include 2-acetamid-3,4,6-tri-O-acetyl-1-chloro-2-deoxy-α-D-glucose and 2-trifluoroacetamido-1-bromo-3,4,6-tri-O-acetyl-2-deoxy-α-D-galactose. Compounds exemplified by the last named compound are preferred for the reasons set forth above in connection with the preparation of the steroid derivatives of this invention.

The reaction sequence will hereinafter be described as applied to the preparation of glucose derivatives, bearing in mind that galactose derivatives may be similarly prepared.

The first reaction in the sequence may be illustrated by the following equation in which X is chlorine or bromine, Ac is acyl, and R and $R_3$ have the same meaning as set forth above, and $R_4$ is an alkoxy, aralkyloxy or dialkylamido group.

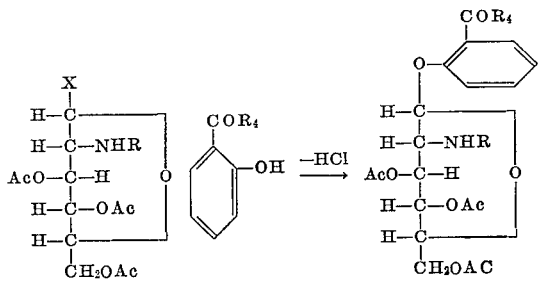

Reaction is effected in a reaction inert organic solvent in the presence of a dehydrohalogenation promoting agent as described above.

For the optimum yields of glycosides, the salicylic acid compound should be devoid of active hydrogen atoms. Thus salicylic acid itself would not normally be employed in the above illustrated reaction, nor would unsubstituted or monosubstituted amides. For the preparation of final compounds in which $R_4$ is hydroxyl, amido or N-alkylamido the first reaction in the sequence is carried out with salicylic acid esters having easily removable ester groups such as benzyl which can be removed by hydrogenation or tert-butyl which can be removed by pyrolysis. These reactions produce compounds in which $R_4$ is hydroxyl, and can be converted to amido or N-alkylamido compounds by reactions described below. For the preparation of simple esters such as carbomethoxy or carboethoxy compounds, methyl salicylate of ethyl salicylate will be empolyed.

The selection of the optimum procedure for the removal of the O-triacyl groups and, if desired, for the removal of the N-trifluoroacetyl group will depend upon the final product which is to be prepared.

For the preparation of N-acylamido of N-trifluoroacetamido compounds only the O-acyl groups need be removed. Such selective hydrolysis is effected under mildly alkaline conditions utilizing an alkaline metal lower alkoxide in a lower alkanol. Sodium methoxide in methanol is especially convenient although other combinations in which the alkanol may contain, for example, up to four carbon atoms may be employed. The reaction is conveniently carried out by mixing the reagents at room temperature and allowing them to stand, preferably with stirring for from about five minutes to about one hour. The ester group of the salicylic acid moiety is stable under the conditions of this reaction.

For the preparation of amino compounds it is best to utilize trifluoroacetamido starting compounds and to remove the trifluoroacetyl group and the O-acyl groups simultaneously by hydrolysis with a stronger base such as an alkali metal hydroxide. The reaction conditions are similar to those described above except that water is employed as the reaction medium, either alone or in association with a lower alkanol. Water-methanol or water-ethanol mixtures which may contain up to 95% alkanol are convenient. Sodium or potassium hydroxide are preferably employed as the basis reagent. The N-acylamido group is stable under these hydrolysis conditions. At the end of the reaction, the base is neutralized by the addition of acid. Sufficient acid must be used to neutralize the basic hydrolysis catalyst and, if desired, to form the acid addition salt. In the reaction, the hydrolysis of the O-acyl groups and the N-trifluoroacetyl group proceeds concurrently with the hydrolysis of the ester group of the salicylic acid moiety to produce a salt which may be isolated, for example by freeze drying, or converted to the acid by acidification of the reaction mixture with a strong acid, suitably an inorganic acid such as hydrochloric or sulfuric acid.

It will be recognized that since the ester group of the salicylic acid moiety is simultaneously removed with the removal of the trifluoroacetyl group, the identity of the salicylic acid ester employed as a starting compound is immaterial when the trifluoroacetyl group is used to block the 2-amino group.

Esters and amides can be prepared from these compounds either before or after substitution of the salicylic acid segments. In one convenient procedure which is generally applicable to the preparation of esters the compound is converted to a silver salt and then treated with an alkyl, aryl or aralkyl halide such as the chloride or bromide. The silver salt may be prepared by dissolving the starting compound, for example the salicylic acid glycoside of glucosamine, in an equimolar quantity of dilute ammonium hydroxide solution at room temperature and adding a molar excess, say up to 20% molar excess of silver nitrate in aqueous solution. The silver salt precipitates and may be purified by washing with water and drying under reduced pressure.

Reaction of the silver salt with the halide is effected in a reaction inert solvent, suitably an anhydrous ether, alkanol or aromatic hydrocarbon solvent such as diethyl ether, di-n-butyl ether, methanol, ethanol, benzene or toluene. The reaction mixture containing the dry silver salt and the selected halide may be maintained at an elevated temperature, suitably the refluxing temperature of the solvent for from about 30 minutes to about 2 hours. A silver halide forms and precipitates. It may be removed by filtration. The desired product may be recovered by removal of the solvent from the filtrate under reduced pressure.

The compound may then be converted by reaction with an acylated salicyloyl chloride to a product of this invention capable of releasing five molecules of salicylic acid. The procedure is discussed below.

For the preparation of amides, an ester prepared as described above may be converted to an acid halide which is in turn reacted with an amine. In this reaction sequence the amine and hydroxyl groups on the glucose moiety must be protected. Accordingly the sequence is employed with the fully acylated glycoside described above or with an N-acylamido compound in which the hydroxyl groups on the glucose segment are fully substituted with salicylic acid radicals.

Any of a number of halogenating agents may be employed including phosphorus trichloride, pentachloride, oxychloride or the corresponding bromides, but the preferred reagent, is thionyl chloride. With this reagent the starting compound is first taken up in a reaction inert organic solvent, suitably an aromatic hydrocarbon solvent such as benzene, toluene or xylene, a slight excess, say up to 10% molar excess of thionyl chloride is added and reaction is completed by maintaining the mixture at from about 25° C. to the refluxing temperature of the solvent for from about 30 minutes to about 2 hours. The product, for example the acid chloride of (ortho-carboxyphenyl)-2′-(ortho - acetoxybenzoyl)-3′,4′,6′-tri-O-(ortho-acetoxybenzoyl)-2′-deoxy-β-D-glucoside may be isolated by removing the solvent under reduced pressure. Preferably, however, it will be converted in situ to an amide by the addition of an amine such as dimethyl amine to produce the N,N-dimethylcarbamido compound. The amide normally precipitates and may be recovered by filtration. Alternatively, the solvent may be removed under reduced pressure to isolate the desired product.

An alternative procedure applicable to the preparation of esters and amides involves, as a first step, the conversion of a fully hydrolyzed intermediate such as the salicylic acid glycoside of glucosamine to a methyl ester by reaction with diazomethane. The resulting ester is then reacted with an ortho-acyloxy salicyloyl chloride to provide the tetraacylated derivative. This ester may be converted to an acid halide and thence to other esters or to amides utilizing the methods described above.

The final products produced in accordance with this invention when the amino group on the glucoside segment is protected prior to reaction with the salicyloyl halide will have only four bound salicylic acid radicals. Three are joined to the 3,4, and 6-hydroxyl groups through ester linkages and one to the 1-position on the glucose or galactose segment of the molecule through an ether linkage.

A very convenient procedure for the preparation of N-alkanoylamido compounds with a free carboxyl group on the salicylic acid moiety, for example (ortho-carboxyphenyl) - 2' - acetamido-3',4',6'-tri-O-(ortho-acetoxyphenyl)-2'-deoxy-β-D-glucoside is to form the glycoside from a benzyl ester of salicylic acid. The benzyl group is stable under the hydrolysis conditions employed to remove the tri-O-acyl groups. It is subsequently removed by catalytic hydrogenation with a catalyst such as palladium on charcoal after the hydroxyl groups have been derivatized with the acyloxy-salicyloyl halide. The benzyl group is especially convenient because it is stable to hydrolysis and is easily removed by hydrogenation. It thus protects the carboxylic group during the reaction with the acetoxy-salicyloyl halide. Once the carboxyl group has been regenerated by hydrogenation it is available for conversion to acid halides, esters or amides utilizing the procedures described above. As an alternative to the benzyl group, the tert-butyl radical can be used to protect the carboxy group. It is subsequently removed by pyrolysis or by treatment with an acid such as hydrochloric acid in benzene at from 10° C. to 25° C. for several hours, e.g. 10 to 20 hours.

The N-acylamido compound is converted to a salicylic acid derivative in which the three hydroxyl groups of the glucose or galactose derivative are bound to calicyl radicals through ester linkages by reaction with an acyloxy salicyloyl halide such as the chloride. The reaction is carried out in the presence of a basic reagent. It may be conveniently carried out in excess pyridine which serves as both solvent and base. It is most conveniently carried out at about room temperature, i.e., about 20° C. to 30° C. although somewhat higher or lower temperatures may be used without adverse effect. The reaction period is from about 10 to about 20 hours. At least three moles of acid halide per mole of glucose or galactose derivative is used and it is preferred to use an excess of this reagent. An excess of as much as 50% may be utilized to insure as complete a reaction as possible.

If instead of an N-acylamido compound an N-amino compound is employed in the above reaction, with at least four molar equivalents of the salicyloyl compound the amino group is converted into a salicylamido group to provide a compound capable of releasing five molecules of salicylic acid. As in the previously described reaction, as much as a 50% molar excess of the acid halide may be used.

It will be noted from an examination of the structural formulas set forth that the salicylic acid radicals are involved in several different types of linkages. The radical bound to the one position of the glucose moiety is bound through an ether linkage. The carboxyl group of this radical may also be derivatized as an ester or an amide. The radical bound to the 3,4 and 6 positions of the glucose moiety are bound through ester linkages and the hydroxyl groups are acylated. The radical at the two position is bound through an amide linkage and its hydroxyl group is also acylated. The cleavage of these various linkages takes place at different rates. Accordingly the salicylicylic acid is released from them at different rates. It is not all released over a short period of time so that a high concentration of salicylic acid does not accumulate in the intestinal tract.

While this invention has been principally described as applied to salicylic acid itself, it is equally applicable to derivatives of this compound such as 3-methyl salicylic acid, 4-trifluoromethyl salicylic acid, 5- or 6-fluoro salicylic acid, 5-benzyloxy salicylic acid, 5-phenyl salicylic acid or derivatives of this last named compound such as 5-(4'-fluorophenyl)-, 5-(2'-fluorophenyl) - 5 - (3'-fluorophenyl) or 5-(2',4'-difluorophenyl)-salicylic acid. Each of these compounds is known to be therapeutically active in the same manner as salicylic acid itself.

As stated above it is specifically intended to include within the scope of this invention acid addition salts or compounds in which the amino group of the glycoside moiety is five. These compounds are normally prepared by adding excess acid to the neutralization mixture in which an acyl group is removed from the nitrogen atom. Typical acid addition salts within the scope of the invention include hydrochlorides, hydrobromides, citrate, tertrates, nitrates, acetates, propionates, succinates, and the like.

The compounds of this invention possess useful therapeutic activity characteristic of the parent compounds, i.e. the steroids, hydroxybutazolidine and salicylic acid. They are normally administered in duly maintenance dosage ranges comparable to the parent compound, for example 1 to 3 g. per day for aspirin and its analogs, 300 to 600 mg. per day for hydroxybutazolidine, 25 to 75 mg. per day for cortisone and hydrocortisone, 2.5 to 10 mg. per day for prednisone and prednisolone and 0.5 to 5 mg. per day for dioxamethasone. Because of their delayed absorption (substantially unaccompanied by undesired side effects) they may, if desired, be administered in substantially higher dosage units without attendant risk of side effects.

The therapeutically active compounds of this invention may be administered alone or associated with a pharmaceutically acceptable carrier the choice of which will depend upon the chosen method of administration and standard pharmaceutical practice. For oral administration the compounds may be administered in the form of tablets containing excipients such as starch or milk sugar. Aqueous solutions such as elixirs which may be sweetened by flavoring agents may also be employed. Therapeutically useful compositions can be prepared which contain other therapeutically active compounds in addition to one or more of the products of this invention. Such compositions are included within the scope of the invention.

The hydrobromide salts of 1-bromo-glucosamine triacylates such as the triacetates, and the corresponding galactosamine derivatives used in the process of the invention are prepared as follows:

A total of 10 g. (1.2 moles) of 2-amino-2-deoxy-α-D-glucose hydrochloride was placed in a dry three-necked flask fitted with a drying tube and sealed stirrer. A total of 25 g. (5 moles) of acetyl bromide was added to the vigorously stirred mixture which was then heated cautiously to a bath temperature of 60–70° until the mixture suddenly solidified (ca. 2 hr.). At this point the flask was removed from the oil bath and connected to a series of four 8-in. U-tubes containing, alternately, calcium chloride and soda lime, all connected to a water pump vacuum. After all the hydrogen bromide was absorbed (ca. 30 min.), the residue was extracted with warm ethanol-free chloroform (prepared by washing successively four times with concentrated sulfuric acid, water, aqueous sodium bicarbonate, and water, and drying over sodium sulfate for 30 min.). Then to the cooled and filtered extract was added dry ether (ethanol-free) to incipient crystallization, yield 16.9 g. (85%) M.P. 149–150°.

1-chloro-N-acetylglucosamine triacetate used as a starting material in the preparation of the compounds of this invention in accordance with the process described above is prepared by the following procedure.

A solution of 23 g. of clean sodium in 1000 ml. of methanol is used in 10 equal portions as described below: 21.5 g. of glucosamine hydrochloride and a 100 ml. aliquot of the above solution is swirled in a 250 ml. Erlenmeyer flask for exactly 70 seconds. The sodium chloride which separates is removed by filtration under pressure through a sintered glass funnel with a 2.1 round bottom flask. This operation is repeated nine more times and the total filter cake washed with 100 ml. of methanol. The total filtrate in the flask is treated under nitrogen with 153 g. of acetic anhydride and warmed for a short time. The solution is then stirred for approximately fifteen hours during which time the N-acetylglucosamine precipitates in approximately 70% yield. It is recovered by filtration, washed extensively with methanol and dried to constant weight, M.P. 202–204°.

This product is converted to the 1-chloro-O-triacetate derivative by the following procedure.

A suspension of 25 g. of N-acetylglucosamine and 70 ml. of acetyl chloride is stirred under nitrogen for ten minutes. At this point, 1 ml. of acetic acid saturated with HCl gas (at 0°) is added and after 15 minutes the mixture starts to gently reflux. At the end of two hours all of the material is in a yellow brown solution. The mixture is then stirred for approximately 15 hours, 500 ml. of cloroform is added, the mixture poured into 1 kg. of ice and stirred for three minutes. (The balance of this procedure should be carried out as rapidly as possible to insure maximum yields.) The mixture is separated and the chloroform layer added rapidly to an ice cold saturated sodium bicarbonate solution with vigorous stirring. The slightly alkaline mixture is again separated and the chloroform layer washed once with water, dried over anhydrous sodium sulfate, filtered and the filtrate evaporated to dryness in vacuo at about 35° C. The residue is taken up in ethyl acetate at 55–60°, filtered, seeded and the product allowed to crystallize overnight in the cold. The yield is 26.8 g. The product is protected from light and stored in a tightly stoppered container in the refrigerator.

The corresponding galactosamine compounds are similarly prepared.

The following examples are given by way of illustration only and are not intended as limitations of this invention, many apparent variations of which are possible without departing from the spirit and scope thereof.

Example 1.—11,17-dihydroxy-3,20-dione-1,4-pregnadiene-21-yl-2'-acetamido-2'-deoxy-$\beta$-D-glucoside A total of 4.5 g. of 11,17,21-trihydroxy-1,4-pregnadiene-3,20-dione is taken up in 25 ml. of dry dimethylformamide containing 17.6 g. of mercuric cyanide and the mixture diluted with 25 ml. of dry xylene. A solution of 13.0 g. of 1-chloro-N-acetylglucosamine triacetate in 100 ml. of 1:1 dimethylformamide-xylene is added dropwise over a period of three hours while stirring the mixture under nitrogen at an oil bath temperature of 130–135° C. The mixture turns quite dark during the addition. It is maintained at 130–135° C. for an additional one and three quarter hours, cooled, diluted with 500 ml. of chloroform and washed four times with 500 ml. portions of water. The aqueous layers are successively back-extracted with chloroform, the combined organic layers dried over anhydrous magnesium sulfate, filtered and the filtrate evaporated in vacuo. The residue is taken up in ethylene chloride and the solvent again removed in vacuo. The residue is then flushed twice with toluene and pumped (oil pump) at about 50° for several hours and then at room temperature overnight. The residue is taken up chloroform and chromatographed on acid washed alumina (only about 10.5 parts alumina/part of solution) keeping the height to diameter ratio of alumina in the column at about 8:1. The column is eluted with methanol-chloroform mixtures containing successively larger proportions of methanol up to 95:5. The product, 11$\beta$,17$\alpha$-dihydroxy-3,20-dione-1,4-pregnadiene-21-yl-2'-acetamido-3', 4',6'-tri-O-acetyl-2'-deoxy-$\beta$-D-glucoside is recovered from the middle fractions. Each fraction is taken to dryness. The first 2-3 fractions consist of a mobile oil. A small amount of methanol is added to subsequent fractions and those which crystallize on scratching are redissolved in chloroform, combined, filtered, taken to dryness and crystallized from ethanol.

A solution of 1.055 g. of the product thus prepared in 120 ml. of spectral grade methanol is treated with an equivalent quantity of freshly prepared sodium-methoxide and kept at room temperature in a nitrogen atmosphere for ten minutes. The pH of the solution is adjusted to neutrality with acetic acid and the mixture filtered. About 6.5 ml. of water is added and the solution centrifuged. The desired product starts to precipate in about ten minutes and the mixture is kept cold overnight. The desired product is recovered by filtration.

The procedure of the foregoing example is utilized to prepare 21-yl-2'-acetamido-2' - deoxy-$\beta$ - D - glucosides and galactosides of the following compounds. In each instance the intermediate O-triacetate is prepared. The list if given to avoid unnecessary repetition of experimental details.

16$\alpha$ - methyl - 11$\beta$,17$\alpha$,21 - trihydroxy - 1,4 - pregnadiene-3,20-dione 16$\beta$ - methyl - 11$\beta$,17$\alpha$,21 - trihydroxy - 1,4 - pregnadiene-3,20-dione 9$\alpha$ - fluoro - 16$\alpha$ - methyl - 11$\beta$,17$\alpha$,21 - trihydroxy-1,4-pregnadiene-3,20-dione 9$\alpha$ - fluoro - 16$\beta$ - methyl - 11$\beta$,17$\alpha$,21 - trihydroxy - 1,4-pregnadiene-3,20-dione 6$\alpha$ - methyl - 17$\beta$,17$\alpha$,21 - trihydroxy - 1,4 - pregnadiene-3,20 - dione 6$\alpha$ - fluoro - 11$\beta$,17$\alpha$,21 - trihydroxy - 1,4 - pregnadiene-3,20-dione 6$\alpha$,16$\alpha$ - dimethyl - 11$\beta$,17$\alpha$,21 - trihydroxy - 1,4 - pregnadiene-3,20-dione 6,16$\alpha$ - dimethyl - 11$\beta$,17$\alpha$,21 - trihydroxy - 1,4,6-pregnatriene-3,20-dione 9$\alpha$ - fluoro - 11$\beta$,16$\alpha$,17$\alpha$,21 - tetrahydroxy - 1,4 - pregnadiene-3,20-dione 9$\alpha$ - fluoro - 6,16$\alpha$ - dimethyl - 11$\beta$,17$\alpha$,21 - trihydroxy-1,4,6-pregnatriene-3,20-dione 17$\alpha$,21 - dihydroxy - 1 - allopregnene - 3,11,20 - triene 9$\alpha$ - fluoro - 11$\beta$,17$\alpha$,21 - trihydroxy - 1 - pregnene - 3, 20-dione 11$\beta$,17$\alpha$,21 - trihydroxy - [3,2-c] - pyrazolo - 4 - pregnene-20-one 11$\beta$,17$\alpha$,21 - trihydroxy - 2' - phenyl - [3,2-c] - pyrazolo-4-pregnene - 20 - one 9$\alpha$ - fluoro - 11$\beta$,17$\alpha$,21 - trihydroxy - [3,2-c] - pyrazolo-4-pregnene-20-one 9$\alpha$ - fluoro - 16$\alpha$ - methyl - 11$\beta$,17$\alpha$,21 - trihydroxy-[3,2-c]-pyrazolo-4-pregnene-20-one 16$\alpha$-methyl-11$\beta$,17$\alpha$,21 - trihydroxy - [3,2-c] - pyrazolo-4-pregnene-20-one 17$\alpha$,21 - dihydroxy - 4 - pregnene - 3,11,20 - triene 6,16$\alpha$ - dimethyl - 11$\beta$,17$\alpha$,21 - trihydroxy - [3,2-c] - pyrazolo-4,6-pregnadiene-20-one 6,16$\alpha$ - dimethyl - 11$\beta$,17$\alpha$,21 - trihydroxy - 2' - phenyl-[3,2-c]-pyrazolo-4,6-pregnadiene-20-one 6,16$\alpha$ - dimethyl - 11$\beta$,17$\alpha$,21 - trihydroxy - 4,6 - pregnadiene-3,20-dione 6$\alpha$ - fluoro - 11$\beta$,17$\alpha$,21 - trihydroxy - 1,4 - pregnadiene-3,20-dione.

Example 2.—9$\alpha$-fluoro-11$\beta$,17$\alpha$,21-trihydroxy-3,20-dione-1,4-pregnadiene-16$\alpha$-yl-2'-acetamido-2'-deoxy - $\beta$ - D-glucoside A total of 9 g. of 9$\alpha$-fluoro-21-acetoxy-11$\beta$ 17$\alpha$-dihydroxy-1,4-pregnadiene-3,20-dione- is taken up in 50 ml. of dimethylformamide containing 36 g. of mercuric cyanide and the mixture diluted with 50 ml. of dry xylene. A solution of 1-chloro-N-acetylglucosamine triacetate in 200 ml. of 1:1 dimethylformamidexylene is added dropwise over a period of three hours while stirring the mixture under nitrogen at an oil bath temperature of 130–135° C. The mixture turns dark during the addition. It is maintained at 130–135° C. for an additional two hours, cooled diluted with one liter of chloroform and washed four times with 500 ml. portions of water. The aqueous layers are successively back-extracted with chloroform, the combined organic layers dried over anhydrous magnesium sulfate, filtered and the filtrate evaporated in vacuo. The residue is taken up in ethylene chloride and the solvent again removed in vacuo. The residue is twice flushed with toluene (oil pump at about 50° for several hours and then at room temperature overnight. The product, 9α-fluoro - 21 - acetoxy - 11β,17α-dihydroxy-3,20-dione-1,4-pregnadiene - 16α - yl-2'-acetamido-3',4',6'-tri-O-acetyl-2'-deoxy-β-D-glucoside is separated on acid washed alumina using mixtures of chloroform and methanol.

This product is hydrolyzed in accordance with the procedure of Example 1 to obtain the desired product.

The procedure of the foregoing example is utilized to prepare 16α - yl - 2'-acetamido-2'-deoxy-β-glucosides and galactosides of the following compounds. In each instance the intermediate O-triacetate is prepared. The list is given to avoid unnecessary repetition of experimental details.

9α-fluoro-11β,16α,17α,21-tetrahydroxy-4-pregnene-3,20-dione

9α-fluoro-2-methyl-11β,16α,17α,21-tetrahydroxy-1,4-pregnadiene-3,20-dione

6α,9α-difluoro-2-methyl-11β,16α,17α,21-tetrahydroxy-4-pregnene-3,20-dione

6α,9α-difluoro-2α-methyl-11β,16α,17α,21-tetrahydroxy 1,4-pregnene-3,20-dione.

Example 3.—11,17 - dihydroxy - 3,20-dione-1,4-pregnadiene-21-yl-2'-trifluoroacetamido-2'-deoxy-β-D-glucoside To a suspension of 0.07 mole of sodium hydride in 51% dispersion in mineral oil in 500 ml. of dry dimethylformamide is added 0.14 mole of 11,17,21-trihydroxy-1,4-pregnadiene-3,20-dione in 25 ml. of dry toluene. After stirring at room temperature for 10 minutes, a solution of 0.068 mole of 2 - trifluoroacetamido-3,4,6-tri-O-acetyl-1-bromo-2-deoxy-α-D-glucose in 100 ml. of toluene is added and the mixture stirred and heated at reflux for 15 minutes. After cooling, the mixture is treated with charcoal, filtered and the solvent removed in vacuo. The mixture is triturated with hexane, filtered and dried. The resulting 11, 17 - dihydroxy - 3,20-dione-1,4-pregnadiene-21-yl-2'-trifluoroacetamido - 3',4',6'-tri-O-acetate-2'-deoxy-β-D-glucose is taken up in 100 ml. of methanol and 20 ml. of 1.25 N methanolic sodium methoxide is added. After stirring at room temperature for 15 minutes, approximately 8 g. of Dry Ice is added to the solution followed by 200 ml. of water. The desired product precipitates and is filtered, washed and dried.

Each of the compounds prepared in accordance with the procedures of Examples 1 and 2 are converted to the corresponding 2'-trifluoroacetamido derivative using the process of this example.

Example 4.—11,17 - dihydroxy - 3,20-dione-1,4-pregnadiene-21-yl-2'-amino-deoxy-β-D-glucoside A mixture of 20 mM. of 11,17-dihydroxy-3,20-dione-1, 4 - pregnadiene - 21-yl-2'-trifluoroacetamido-3',4',6'-tri-O-acetate-2'-deoxy-β-D-glucose prepared as described in the previous example, 40 ml. of water and 60 ml. of 1 N sodium hydroxide is stirred at room temperature for one and one-half hours. After cooling the mixture in ice, the mixture is made strongly acid by the addition of 1 N hydrochloric acid solution. The solution is concentrated to dryness in vacuo below 25° C. The residue is dissolved in 15–20 ml. of water and the desired product isolated by chromatography over a sulfonic ion exchange column on the hydrogen cycle. The free base is absorbed on the column and eluted with dilute ammonium hydroxide solution.

Each of the compounds prepared in accordance with the previous example are similarly converted to free amino compounds.

Acid addition salts such as the hydrochloride, hydrobromide, citrate, tartrate, acetate, propionate and phosphate are prepared by taking up the free base in an aqueous solution containing an equimolar quantity of the selected acid and freeze drying, or, alternatively, by using a similar methanol solution of the acid and evaporating the solvent.

Example 5.—11,17-dihydroxy-3,20-dione-1,4-pregnadiene-21 - yl-2'-acetamido-3',4',6'-tri-O-(ortho-acetoxybenzoyl)-β-D-glucoside A solution of 27 mM. of the compound prepared in Example 1 in 140 ml. of pyridine is cooled in an ice bath and 160 mM. of acetyl salicyloyl chloride is added in portions with stirring. The mixture is stirred at room temperature for 10 hours and poured into 600 ml. of an ice-water mixture. The aqueous mixture is extracted with an equal volume of ethylene dichloride and the organic layer washed with 5% aqueous sodium bicarbonate solution and with water. It is dried over anhydrous magnesium sulfate, filtered and the solvent removed under reduced pressure. The product is purified on an alumina column.

Each of the products prepared in Examples 1, 2, and 3 is similarly converted to a tri-salicylate derivative.

Example 6. — 11,17 - dihydroxy - 3,20 - dione - 1,4 - pregnadiene - 21 - yl - 2' - (ortho - acetoxybenzoylamido)-3',4',6'-tri-O-(ortho-acetoxybenzoyl)-β-D-glucose This compound is prepared in accordance with the procedure of Example 5 except that 4.5 molar equivalents of acetyl salicyloyl chloride is employed.

Each of the compounds prepared in Example 4 are similarly converted to their tetrasalicylate analogs.

Example 7.—2-trifluroracetamido-3,4,6-tri-O-acetyl-1-bromo-2-deoxy-α-D-glucosede To 15 ml. of trifluoroaceticanhydride is added 2 g. (0.0045 mole) of 3,4,6-tri-O-acetyl-2-amino2-deoxy-α-D-glucosyl bromide hydrobromide in a 100 ml. round-bottomed flask. The flask is protected from moisture with Drierite and the solution is kept at room temperature for about 16 hours. The solution is concentrated in vacuo to a viscous brown colored oil which is dissolved in methylene chloride and extracted 3 times with 200 ml. portions of a saturated solution of sodium chloride. The organic layer is dried over anhydrous magnesium sulfate and the solvent evaporated. The white foam is crystallized from about 250 ml. of hot n-hexane to give the desired product.

The following compounds are similarly prepared utilizing the corresponding tri-O-acylated compounds as starting materials:

2-trifluoroacetamido-3,4,6-tri-O-acetyl-1-bromo-2-deoxy-α-D-galactosede 2-trifluoroacetamido-3,4,6-tri-O-acetyl-1-bromo-2-deoxy-α-D-glucosede 2-trifluoroacetamido-3,4,6-tri-O-butyryl-1-bromo-2-deoxy-α-D-glucosede 2-trifluoroacetamido-3,4,6-tri-O-butyryl-1-bromo-2-deoxy-α-D-galactosede.

Example 8.—(Ortho-carbomethoxyphenyl)-2'-trifluoroacetamido-3',4',6'-tri-O-acetyl-2'-deoxy-α-D-glucoside To a suspension of 0.92 g. of sodium hydride (1.8 g. of a 51% dispersion in mineral oil, 0.0383 mole) in 250 ml. of dry toluene is added 10 g. (0.0658 mole) of methyl salicylate, dropwise. After stirring at room temperature for ten minutes, a solution of 14.8 g. (0.0334 mole) of the compound prepared in Example 1 in 50 ml. of toluene is added and the mixture stirred and heated at reflux for 15 minutes. After cooling, the mixture is treated with charcoal, filtered, and the solvent removed in vacuo. The residue is triturated with hexane to afford 11.0 g. of an amorphous solid which is recrystallized from hexane to yield the desired product.

The following compounds are similarly prepared using the appropriate 1-bromo-N-trifluoroacetyl glucosamine triacylate or the corresponding galactosamine triacylate together with the appropriate derivative of methyl salicylate as starting compounds.

(1-carbomethoxy-6-methylphenyl)-2'-trifluoroacetamido-3',4',6'-tri-O-acetyl-2'-deoxy-β-D-glucoside
(1-carbomethoxy-6-methylphenyl)-2'-trifluoroacetamido-3',4',6'-tri-O-acetyl-2'-deoxy-β-D-galactoside
(1-carbomethoxy-4-trifluoromethylphenyl)-2'-trifluoroacetamido-3',4',6'-tri-O-butyryl-2'-deoxy-β-D-glucoside
(1-carbomethoxy-4-trifluoromethylphenyl)-2'-trifluoroacetamido-3',4',6'-tri-O-butyryl-2'-deoxy-β-D-galactoside
(1-carbomethoxy-4-trifluoromethylphenyl)-2'-trifluoroacetamido-3',4',6'-tri-O-butyryl-2'-deoxy-β-D-galactoside
(1-carbomethoxy-3-fluorophenyl)-2'-trifluoroacetamido-3',4',6'-tri-O-acetyl-2'-deoxy-β-D-glucoside
(1-carbomethoxy-3-fluorophenyl)-2'-trifluoroacetamido-3',4',6'-tri-O-acetyl-2'-deoxy-β-D-galactoside
(1-carbomethoxy-2-fluorophenyl)-2'-trifluoroacetamido-3',4',6'-tri-O-acetyl-2'-deoxy-β-D-glucoside
(1-carbomethoxy-2-fluorophenyl)-2'-trifluoroacetamido-3',4',6'-tri-O-acetyl-2'-deoxy-β-D-galactoside
(1-carbomethoxy-3-benzyloxyphenyl)-2'-trifluoroacetamido-3',4',6'-tri-O-acetyl-2'-deoxy-β-D-glucoside
(1-carbomethoxy-3-benzyloxyphenyl)-2'-trifluoroacetamido-3',4',6'-tri-O-acetyl-2'-deoxy-β-D-galactoside
(1-carbomethoxy-3-phenylphenyl)-2'-trifluoroacetamido-3',4',6'-tri-O-propionyl-2'-deoxy-β-D-glucoside
(1-carbomethoxy-3-phenylphenyl)-2'-trifluoroacetamido-3',4',6'-tri-O-propionyl-2'-deoxy-β-D-galactoside
[1-carbomethoxy-3-(4'-fluorophenyl)-phenyl]-2'-trifluoroacetamido-3',4',6'-tri-O-acetyl-2'-deoxy-β-D-glucoside
[1-carbomethoxy-3-(4'-fluorophenyl)-phenyl]-2'-trifluoroacetamido-3',4',6'-tri-O-acetyl-2'-deoxy-β-D-galactoside
[1-carbomethoxy-3-(2'-fluorophenyl)-phenyl]-2'-trifluoroacetamido-3',4',6'-tri-O-acetyl-2'-deoxy-β-D-glucoside
[1-carbomethoxy-3-(2'-fluorophenyl)-phenyl]-2'-trifluoroacetamido-3',4',6'-tri-O-acetyl-2'-deoxy-β-D-galactoside
[1-carbomethoxy-3-(3'-fluorophenyl)-phenyl]-2'-trifluoroacetamido-3',4',6'-tri-O-acetyl-2'-deoxy-β-D-glucoside
[1-carbomethoxy-3-(3'-fluorophenyl)-phenyl]-2'-trifluoroacetamido-3',4',6'-tri-O-acetyl-2'-deoxy-β-D-galactoside
[1-carbomethoxy-3-(2',4-difluorophenyl)-phenyl]-2'-trifluoroacetamido-3',4',6'-tri-O-acetyl-2'-deoxy-β-D-glucoside
[1-carbomethoxy-3-(2'-difluorophenyl)-phenyl]-2'-trifluoroacetamido-3',4',6'-tri-O-acetyl-2'-deoxy-β-D-galactoside.

In addition to methyl esters the following esters of the above named compounds are similarly prepared utilizing the appropriate ester of salicylic acid or derivative thereof as starting compounds:

benzyl          4-methylbenzyl
ethyl           hexyl
propyl          p-methylphenyl
tert-butyl      4-trifluoromethylbenzyl
phenyl          isopropyl Example 9.—(Ortho-carbomethoxyphenyl)-2'-trifluoroacetamido-2'-deoxy-β-D-glucoside To a suspension of 6.4 g. (0.012 mole) of the compound prepared in the previous example in 50 ml. of methanol, is added 10 ml. of 1.25 N methanolic sodium methoxide. After stirring at room temperature for 15 minutes, approximately 4 g. of Dry Ice is added to the solution, followed by 200 ml. of water. The desired product precipitates and is filtered, washed, and dried.

The following compounds are similarly prepared from the compounds prepared in Example 2:

(Ortho-carbomethoxyphenyl)-2'-trifluoroacetamido-2'-trifluoroacetamido-2'-deoxy-β-D-galactoside
(Ortho-carbethoxyphenyl)-2'-trifluoroacetamido-2'-deoxy-β-D-glucoside
(Ortho-carbethoxyphenyl)-2'-trifluoroacetamido-2'-deoxy-β-D-galactoside
(Ortho-carbopropoxyphenyl)-2'-trifluoroacetamido-2'-deoxy-β-D-glucoside
(Ortho-carbopropoxyphenyl)-2'-trifluoroacetamido-2'-deoxy-β-D-galactoside.

Example 10.—(Ortho-carboxyphenyl)-2'-amino-2'-deoxy-β-D-glucoside

A mixture of 4.25 g. (10.4 mole) of the compound of the previous example, 40 ml. of water and 30 ml. of 1 N sodium hydroxide is stirred at room temperature for 2.5 hours. After cooling the clear solution in ice, the pH is brought to 3.5 by the addition of about 25 ml. of 1 N hydrochloric acid. The solution is concentrated to dryness in vacuo below 30° C. The residue is dissolved in 15–20 ml. of water and applied to a column of 50 ml. of IR–120 resin on the hydrogen cycle. (This resin is a sulfonic resin available from Rohm & Haas of Philadelphia, Pa.). The column is eluted with water until a negative test for chloride ion is obtained (150 ml.), and then with 1% ammonium hydroxide until no more product is removed (375 ml.).

The ammonia eluates are concentrated to dryness in vacuo and the residue recrystallized from aqueous acetone to yield the desired product.

The sodium salt of this compound is prepared by freeze drying the hydrolysis mixture after stirring at room temperature for 2.5 hours.

The following compounds are similarly prepared, the potassium salts by replacement of sodium hydroxide with potassium hydroxide:

(Ortho-carboxyphenyl)-2-amino-2'-deoxy-β-D-galactoside
Potassium salt of (ortho-carboxyphenyl)-2'-amino-2'-deoxy-β-D-glucoside
Potassium salt of (ortho-carboxyphenyl)-2'-amino-2'-deoxy-β-D-galactoside Acid addition salts such as the hydrochloride, hydrobromide, citrate, tartrate, acetate, propionate, and phosphate are prepared by taking up the free base in an aqueous solution of the acid containing an equimolar quantity of the acid and freeze drying or, alternatively, by using a similar methanol solution of the acid and evaporating the solvent.

Example 11.—(Ortho-carboxyphenyl)-2'-propionamido-2'-deoxy-β-D-glucoside

A mixture of 4 g. of (ortho-carboxyphenyl)-2'-amino-2'-deoxy-β-D-glucoside and an equimolar portion of propionic anhydride in an equal volume of pyridine is allowed to stand at room temperature for two hours. The mixture is then poured into 250 ml. of ice-dilute hydrochloric acid, and the mixture extracted six times with 50 ml. portions of methylene chloride. The organic layer is separated, dried over anhydrous magnesium sulfate, filtered and the solvent removed in vacuo to leave the desired product as a residue.

The corresponding galactose compound is similarly prepared.

Example 12.—(Ortho-carboxyphenyl)-2'-acetamido-3',
4',6'-tri-O-(ortho-acetoxybenzoyl)-β-D-glucoside A solution of 3.0 g. (3.26 mM.) of the benzyl ester of the desired compound in 25 ml. of dioxane is hydrogenated at 25° C. and 40 pounds per square inch pressure using 1.5 g. of palladium on charcoal catalyst. The uptake of hydrogen stops after about two hours. The catalyst is removed by filtration and the desired product obtained after removal of the solvent at reduced pressure.

The following compounds are similarly prepared from the products prepared in Example 11.

(1-carboxy-6-methylphenyl)-2'-acetamido-3',4',6'-tri-O-(2-acetoxy-3-methylbenzoyl)-2'-deoxy-β-D-glucoside
(1-carboxy-6-methylphenyl)-2'-acetamido-3',4',6'-trio-O-(2-acetoxy-3-methylbenzoyl)-2'-deoxy-β-D-galactoside
(1-carboxy-4-trifluoromethylphenyl)-2'-propionamido-3',4',6'-tri-O-(1-acetoxybenzoyl)-2'-deoxy-β-D-glucoside
(1-carboxy-4-trifluoromethylphenyl)-2'-propionamido-3',4',6'-tri-O-(1-acetoxybenzoyl)-2'-deoxy-β-D-galactoside
(1-carboxy-3-fluorophenyl)-2'-butyramido-3',4',6'-tri-O-(2-acetoxy-6-fluorobenzoyl)-2'-deoxy-β-D-glucoside
(1-carboxy-3-fluorophenyl)-2'-butyramido-3',4',6'-tri-O-(2-acetoxy-6-fluorobenzoyl)-2'-deoxy-β-D-galactoside
(1-carboxy-2-fluorophenyl)-2'-butyramido-3',4',6'-tri-O-2'-acetoxy-5-benzyloxybenzoyl)-2'-deoxy-β-D-glucoside
(1-carboxy-2-fluorophenyl)-2'-butyramido-3',4',6'-tri-O-2'-acetoxy-5-benzyloxybenzoyl)-2'-deoxy-β-D-galactoside
(1-carboxy-3-benzyloxyphenyl)-2'-acetamido-3',4',6'-tri-O-(2-acetoxybenzoyl)-2'-deoxy-β-D-glucoside
(1-carboxy-3-benzyloxyphenyl)-2'-acetamido-3',4',6'-tri-O-(2-acetoxybenzoyl)-2'-deoxy-β-D-galactoside
(1-carboxy-3-phenylphenyl)-2'-propionamido-3',4',6'-tri-O-[1-acetoxy-4-(4'-fluorophenyl)-benzoyl]-2'-deoxy-β-D-glucoside
(1-carboxy-3-phenylphenyl)-2'-propionamido-3',4',6'-tri-O-[1-acetoxy-4-(4'-fluorophenyl)-benzoyl]-2'-deoxy-β-D-galactoside
[1-carboxy-3-(4'-fluorophenyl)-phenyl]-2-acetamido-3',4',6'-tri-O-(2-butoxy-4-trifluoromethylbenzoyl)-2'-deoxy-β-D-glucoside
[1-carboxy-3-(4'-fluorophenyl)-phenyl]-2-acetamido-3',4',6'-tri-O-(2-butoxy-4-trifluoromethylbenzoyl)-2'-deoxy-β-D-galactoside
[1-carboxy-3-(2'-fluorophenyl)-phenyl]-2'-acetamido-3',4',6'-tri-O-(2-propionoxybenzoyl)-2'-deoxy-β-D-glucoside
[1-carboxy-3-(2'-fluorophenyl)-phenyl]-2'-acetamido-3',4',6'-tri-O-(2-propionoxybenzoyl)-2'-deoxy-β-D-galactoside
[1-carboxy-3-(3'-fluorophenyl)-phenyl]-2'-acetamido-3',4',6'-tri-O-(2-acetoxybenzoyl)-2'-deoxy-β-D-glucoside
[1-carboxy-3-(3'-fluorophenyl)-phenyl]-2'-acetamido-3',4',6'-tri-O-(2-acetoxybenzoyl)-2'-deoxy-β-D-galactoside
[1-carboxy-3-(2',4-difluorophenyl)-phenyl]-2'-acetamido-3',4',6'-tri-O-(2-acetoxybenzoyl)-2'-deoxy-β-D-glucoside
[1-carboxy-3-(2',4-difluorophenyl)-phenyl]-2'-acetamido-3',4',6'-tri-O-(2-acetoxybenzoyl)-2'-deoxy-β-D-galactoside.

Example 13.—Hydroxybutazolidine-2'-trifluoroacetamido-3',4',6'-tri-O-acetyl-2'-deoxy-β-D-glucoside A mixture containing 1 g. of hydroxybutazolidine and an equivalent amount of 2-trifluoroacetamido-3,4,6-tri-O-β-D-glucoside in one liter of acetone containing 3.6 mm. of sodium hydroxide is heated under reflux for two hours while nitrogen is bubbled through. The solvent and a small amount of water is removed in vacuo. The residue is washed with water and taken up in ethylene dichloride. The organic mixture is clarified by filtration and the solvent removed at low pressure to yield the desired product as a residue.

The following compounds are similarly prepared using the corresponding tri-O-acylated compounds as starting materials:

Hydroxybutazolidine-2'-trifluoroacetamido-3',4',6'-tri-O-acetyl-2'-deoxy-β-D-glucoside
Hydroxybutazolidine-2'-trifluoroacetamido-3',4',6'-tri-O-propionyl-2'-deoxy-β-D-glucoside
Hydroxybutazolidine-2'-trifluoroacetamido-3',4',6'-tri-O-propionyl-2'-deoxy-β-D-galactoside
Hydroxybutazolidine-2'-trifluoroacetamido-3',4',6'-tri-O-butyryl-2'-deoxy-β-D-glucoside
Hydroxybutazolidine-2'-trifluoroacetamido-3',4',6'-tri-O-butyryl-2'-deoxy-β-D-galactoside.

Example 14.—Hydroxybutazolidine-2'-trifluoroacetamido-2'-deoxy-β-D-glucoside

To a suspension of 12 g. of the compound prepared in the previous example in 150 ml. of ethanol is added an equimolar portion of sodium ethoxide in 30 ml. of the same solvent. The mixture is stirred at room temperature for one-half hour and 6 g. of Dry Ice is added followed by 300 ml. of water. The product precipitates and is recovered by filtration.

The compound, hydroxybutazolidine-2'-trifluoroacetamido-2'-deoxy-β-D-galactoside is similarly prepared.

Example 15.—Hydroxybutazolidine-2'-amino-2'-deoxy-β-D-glucoside

A mixture of 5 g. of the product prepared in the previous example in 80 ml. of water containing a slight molar excess of potassium hydroxide is stirred at 40° C. for one hour. After cooling the pH is adjusted to 3 with dilute hydrochloric acid and the desired product isolated in the manner described in Example 4.

The compound hydroxybutazolidine-2'-amino-2'-deoxy-β-D-galactoside is similarly prepared.

Example 16.—Hydroxybutazolidine-2'-butyramido-2'-β-D-glucoside

This compound and hydroxybutazolidine-2'-butyramido-2'-deoxy-β-D-galactose are prepared from the compounds prepared in Example 15 using the procedure of Example 11, but replacing the propionic anhydride with butyric anhydride.

Example 17.—Hydroxybutazolidine-2'-acetamido-3',4',6'-tri-O-acetyl-2'-deoxy-β-D-glucoside This compound and hydroxybutazolidine-2'-acetamido-3',4',6'-tri-O-ocetyl-2'-deoxy-β-D-galactoside are prepared from the products prepared in Example 15 using the procedure of Example 11 with butyric anhydride.

Example 18.—(Ortho-carbobenzyloxyphenyl) - 2' - acetamido-3',4',6'-tri-O-acetyl-2'-deoxy-β-D-glucoside A mixture of 3.4 g. (9.3 mM.) of 1-chloro-N-acetylglucosamine triacetate, 80 ml. of acetone, 3.8 g. of anhydrous potassium carbonate and 3.65 g. (16 mM.) of benzyl salicylate is stirred at 25° C. for 18 hours. The mixture is filtered, the filtrate concentrated to dryness in vacuo, and the residue recrystallized from ethanol-ether to yield the desired product.

The following compounds are similarly prepared using the appropriate 1-chloro-N-acylglucosamine triacylate or the corresponding galactosamine triacylate together with the appropriate derivative of benzyl salicylate as starting compounds.

(1-carbobenzyloxy-6-methylphenyl)-2'-acetamido-3',4',6'-tri-O-acetyl-2'-deoxy-β-D-glucoside
(1-carbobenzyloxy-6-methylphenyl)-2'-acetamido-3',4'6'-tri-O-acetyl-2'-deoxy-β-D-galactoside
(1-carbobenzyloxy-4-trifluoromethylphenyl)-2'-propionamido-3',4',6'-tri-O-butyryl-2'-deoxy-β-D-glucoside (1-carbobenzyloxy-4-trifluoromethylphenyl)-2′-propion-
    amido-3′,4′,6′-tri-O-butyryl-2′-deoxy-β-D-galactoside
(1-carbobenzyloxy-3-fluorophenyl)-2′-butyramido-3′,4′,
    6′-tri-O-acetyl-2′-deoxy-β-D-glucoside
(1-carbobenzyloxy-3-fluorophenyl)-2′-butyramido-3′,4′-
    6′-tri-O-acetyl-2′-deoxy-β-D-galactoside
(1-carbobenzyloxy-2-fluorophenyl)-2′-butyramido-3′,4′-,
    6′-tri-O-acetyl-2′-deoxy-β-D-glucoside
(1-carbobenzyloxy-2-fluorophenyl)-2′-butyramido-3′,4′,
    6′-tri-O-acetyl-2′-deoxy-β-D-galactoside
(1-carbobenzyloxy-3-benxyloxyphenyl)-2′-acetamido-3′,
    4′,6′-tri-O-acetyl-2′-deoxy-β-D-glucoside
(1-carbobenzyloxy-3-benzyloxyphenyl)-2′-acetamido-3′,
    4′,6′-tri-O-acetyl-2′-deoxy-β-D-galactoside
(1-carbobenzyloxy-3-phenylphenyl)-2′-propionamido-
    3′,4′,6′-tri-O-propionoyl-2′-deoxy-β-D-glucoside
(1-carbobenzyloxy-3-phenylphenyl)-2′-propionamido-
    3′,4′,6′-tri-O-propionoyl-2′-deoxy-β-D-galactoside
[1-carbobenzyloxy-3-(4′-fluorophenyl)-phenyl]-2′-acet-
    amido-3′,4′,6′-tri-O-acetyl-2′-deoxy-β-D-glucoside
[1-carbobenzyloxy-3-(4′-fluorophenyl)-phenyl]-2′-
    acetamido-3′,4′,6′-tri-O-acetyl-2′-deoxy-β-D-galactoside
[1-carbobenzyloxy-3-(2′-fluorophenyl)-phenyl]-2′-acet-
    amido-3′,4′,6′-tri-O-acetyl-2′-deoxy-β-D-glucoside
[1-carbobenzyloxy-3-(2′-fluorophenyl)-phenyl]-2′-
    acetamido-3′,4′,6′-tri-O-acetyl-2′-deoxy-β-D-galactoside
[1-carbobenzyloxy-3-(3′-fluorophenyl)-phenyl]-2′-acet-
    amido-3′,4′,6′-tri-O-acetyl-2′-deoxy-β-D-glucoside
[1-carbobenzyloxy-3-(3′-fluorophenyl)-phenyl]-2′-
    acetamido-3′,4′,6′-tri-O-acetyl-2′-deoxy-β-D-galactoside
[1-carbobenzyloxy-3-(2′,4-difluorophenyl)-phenyl]-2′-
    acetamido-3′,4′,6′-tri-O-acetyl-2′-deoxy-β-D-glucoside
[1-carbobenzyloxy-3-(2′,4-difluorophenyl)-phenyl]-2′-
    acetamido-3′,4′,6′-tri-O-acetyl-2′-deoxy-β-D-galactoside.

In addition to benzyl esters the following esters of the above named compounds are similarly prepared utilizing the appropriate ester of salicylic acid or derivative thereof as starting compounds.

| | |
|---|---|
| methyl | 4-methylbenzoyl |
| ethyl | hexyl |
| propyl | p-methylphenyl |
| tert-butyl | 4-trifluoromethylbenzoyl |
| phenyl | isopropyl |

Example 19.—(Ortho-carbobenzyloxyphenyl)-2′-acet-
    amido-2′-deoxy-β-D-glucoside A solution of 3.0 g. (5.4 mM.) of the compound prepared in the previous example in 44 ml. of methanol containing 4.2 mM. of sodium methoxide is shaken at room temperature for 5 minutes during which a gelatinous precipitate forms. The mixture is cooled in ice, filtered, and the precipitated product washed with methanol and ether. Recrystallization from ethanol provides the desired product in pure form.

The following compounds are similarly prepared from the starting compounds prepared in the first example. For convenience only benzyl esters are listed, although analogous compounds are similarly prepared from the other esters prepared in Example 18.

(1-carbobenzyloxy-6-methylphenyl)-2′-acetamido-2′-
    deoxy-β-D-glucoside
(1-carbobenzyloxy-6-methylphenyl)-2′-acetamido-2′-
    deoxy-β-D-galactoside
(1-carbobenzyloxy-4-trifluoromethylphenyl)-2′-propion-
    amido-3′,4′,6′-tri-O-butyryl-2′-deoxy-β-D-glucoside
(1-carbobenzyloxy-4-trifluoromethylphenyl)-2′-propion-
    amido-3′,4′,6′-tri-O-butyryl-2′-deoxy-β-D-galactoside
(1-carbobenzyloxy-3-fluorophenyl)-2′-butyramido-2′-
    deoxy-β-D-glucoside
(1-carbobenzyloxy-3-fluorophenyl)-2′-butyramido-2′-
    deoxy-β-D-galactoside
(1-carbobenzyloxy-2-fluorophenyl)-2′-butyramido-2′-
    deoxy-β-D-glucoside
(1-carbobenzyloxy-2-fluorophenyl)-2′-butyramido-2′-
    deoxy-β-D-galactoside
(1-carbobenzyloxy-3-benzyloxyphenyl)-2′-acetamido-2′-
    deoxy-β-D-glucoside
(1-carbobenzyloxy-3-benzyloxyphenyl)-2′-acetamido-2′-
    deoxy-β-D-galactoside
(1-carbobenzyloxy-3-phenylphenyl)-2′-propionamido-
    3′,4′,6′-tri-O-propionoyl-2′-deoxy-β-D-glucoside
(1-carbobenzyloxy-3-phenylphenyl)-2′-propionamido-
    3′,4′,6′-tri-O-propionoyl-2′-deoxy-β-D-galactoside
[1-carbobenzyloxy-3-(4′-fluorophenyl)-phenyl]-2′-acet-
    amido-2′-deoxy-β-D-glucoside
[1-carbobenzyloxy-3-(4′-fluorophenyl)-phenyl]-2′-acet-
    amido-2′-deoxy-β-D-galactoside
[1-carbobenzyloxy-3-(2′-fluorophenyl)-phenyl]-2′-acet-
    amido-2′-deoxy-β-D-glucoside
[1-carbobenzyloxy-3-(2′-fluorophenyl)-phenyl]-2′-acet-
    amido-2′-deoxy-β-D-galactoside
[1-carbobenzyloxy-3-(3′-fluorophenyl)-phenyl]-2′-acet-
    amido-3′-deoxy-β-D-glucoside
[1-carbobenzyloxy-3-(3′-fluorophenyl)-phenyl]-2′-acet-
    amido-3′-deoxy-β-D-galactoside
[1-carbobenzyloxy-3-(2′,4-difluorophenyl)-phenyl]-2′-
    acetamido-2′-deoxy-β-D-glucoside
[1-carbobenzyloxy-3-(2′,4-difluorophenyl)-phenyl]-2′-
    acetamido-2′-deoxy-β-D-galactoside Example 20.—(Ortho-carbobenzyloxyphenyl)-2′-aceta-
    mido-3′,4′,6′-tri-O-(ortho-acetoxybenzoyl-β-D-glu-
    coside A solution of the compound prepared in the previous example (5.85 g., 13.6mM.) in 70 ml. of pyridine is cooled in an ice bath and 16.5 g. (80.2 mM.) of acetyl salicyloyl chloride is added in portions with stirring. The mixture is stirred at room temperature for 16 hours and poured into 300 ml. of an ice-water mixture. The aqueous mixture is extracted with an equal volume of methylene chloride and the organic layer washed with 5% aqueous sodium bicarbonate solution and with water. It is dried over anhydrous magnesium sulfate, filtered and the solvent removed under reduced pressure. The residue is chromatographed on a column of 400 g. of neutral alumina. The product is recovered by elution of the column with methylene chloride followed by removal of the solvent in vacuo.

The following compounds are similarly prepared. Again only benzyl esters are listed. However analogous compounds are prepared from the other esters prepared in Example 19.

(1-carbobenzyloxy-6-methylphenyl)-2′-acetamido-3′,4′,
    6′-tri-O-(2-acetoxy-3-methylbenzoyl)2′-deoxy-β-D-
    glucoside
(1-carbobenzyloxy-6-methylphenyl)-2′-acetamido-3′,4′,
    6′-tri-O-(2-acetoxy-3-methylbenzoyl)-2′-deoxy-β-D-
    galactoside
1-carbobenzyloxy-4-trifluoromethylphenyl)-2′-propion-
    amido-3′,4′,6′-tri-O-(1-acetoxybenzoyl)-2′-deoxy-β-D-
    glucoside
(1-carbobenzyloxy-4-trifluoromethylphenyl)-2′-propion-
    amido-3′,4′,6′-tri-O-(1-acetoxybenzoyl)-2′-deoxy-β-D-
    galactoside
(1-carbobenzyloxy-3-fluorophenyl)-2′-butyramido-3′,4′,
    6′-tri-O-(2-acetoxy-6-fluorobenzoyl)-2′-deoxy-β-D-
    galactoside
(1-carbobenzyloxy-2-fluorophenyl)-2′-butyramido-3′,4′,
    6′-tri-O-(2-acetoxy-5-benzoyloxybenzoyl)-2′-deoxy-β-D-
    glucoside
(1-carbobenzyloxy-2-fluorophenyl)-2′-butyramido-3′,4′,
    6′-tri-O-(2-acetoxy-5-benzoyloxybenzoyl)-2′-deoxy-β-D-
    galactoside
(1-carbobenzyloxy-3-benzyloxyphenyl)-2′-acetamido-
    3′,4′,6′-tri-O-(2-acetoxybenzoyl)-2′-deoxy-β-D-glu-
    coside
(1-carbobenzyloxy-3-benzyloxyphenyl)-2′-acetamido-
    3′,4′,6′-tri-O-(2-acetoxybenzoyl)-2′-deoxy-β-D-
    galactoside (1-carbobenzyloxy-3-phenylphenyl)-2′-propionamido-
3′,4′,6′-tri-O-[1-acetoxy-4-(4′-fluorophenyl)-
benzoyl]-2′-deoxy-β-D-glucoside (1-carbobenzyloxy-3-phenylphenyl)-2′-propionamido-
3′,4′,6′-tri-O-[1-acetoxy-4-(4′-fluorophenyl)-
benzoyl]-2′-deoxy-β-D-galactoside

[1-carbobenzyloxy-3-(4′-fluorophenyl)-phenyl]-2-
acetamido-3′,4′,6′-tri-O-(2-butoxy-4-trifluoromethyl-
benzoyl]-2′-deoxy-β-D-glucoside

[1-carbobenzyloxy-3-(4′-fluorophenyl)-phenyl]-2-
acetamido-3′,4′,6′-tri-O-(2-butoxy-4-trifluoromethyl-
benzoyl)-2′-deoxy-β-D-galactoside

[1-carbobenzyloxy-3-(2′-fluorophenyl)-phenyl]-2′-
acetamido-3′,4′,6′-tri-O-(2-propionoxybenzoyl)-2′-
deoxy-β-D-glucoside

[1-carbobenzyloxy-3-(2′-fluorophenyl)-phenyl]-2′-
acetamido-3′,4′,6′-tri-O-(2-propionoxybenzoyl)-2′-
deoxy-β-D-galactoside

[1-carbobenzyloxy-3-(3′-fluorophenyl)-phenyl]-2′-
acetamido-3′,4′,6′-tri-O-(2-acetoxybenzoyl)-2′-deoxy-
β-D-glucoside

[1-carbobenzyloxy-3-(3′-fluorophenyl)-phenyl]-2′-
acetamido-3′,4′,6′-tri-O-(2-acetoxybenzoyl)-2′-deoxy-
β-D-galactoside

[1-carbobenzyloxy-3-(2′,4-difluorophenyl)-phenyl]-2-
acetamido-3′,4′,6′-tri-O-(2-acetoxybenzoyl)-2′-deoxy-
β-D-glucoside

[1-carbobenzyloxy-3-(2′,4-difluorophenyl)-phenyl]-2-
acetamido-3′,4′,6′-tri-O-(2-acetoxybenzoyl)-2′-deoxy-
β-D-galactoside Example 21.—[1-(N,N - dimethylcarbamido)-phenyl]-2′-acetamido - 3′,4′,6′-tri-O-(ortho - acetoxybenzoyl-β-D-glucoside To a mixture of 4.12 g. (5.0 mM.) of (ortho-carbomethoxyphenyl) - 2′ - acetamido - 3′,4′,6′ - tri - O-(ortho-acetoxybenzoyl)-β-D-glucoside in 40 ml. of benzene is added 4.0 ml. (5.5 mM.) of thionyl chloride. The mixture is refluxed for one hour, cooled and 10 ml. of solvent removed under reduced pressure. A solution of 240 mg. (5.1 mM.) of dimethylamine in 10 ml. of benzene is added and the mixture stirred for ten minutes. The solvent is then removed under reduced pressure and the residue washed with water, and the desired product recovered by filtration.

The following compounds are similarly prepared:

[1-(N,N-dimethylcarbamido)-phenyl]-2′-acetamido-
3′,4′,6′-tri-O-(2-acetoxy-3-methylbenzoyl)-2′-deoxy-
β-D-glucoside

[1-(N,N-dimethylcarbamido)-phenyl]-2′-acetamido-
3′,4′,6′-tri-O-(2-acetoxy-3-methylbenzoyl)-2′-deoxy-
β-D-galactoside

[1-(N,N-dimethylcarbamido)-phenyl]-2′-propionamido-
3′,4′,6′-tri-O-(1-acetoxybenzoyl)-2′-deoxy-
β-D-glucoside

[1-(N,N-dimethylcarbamido)-phenyl]-2′-propionamido-
3′,4′,6′-tri-O-(1-acetoxybenzoyl)-2′-deoxy-
β-D-galactoside

[1-(N,N-diethylcarbamido)-phenyl]-2′-butyramido-
3′,4′,6′-tri-O-(2-acetoxy-6-fluorobenzoyl)-2′-deoxy-β-
D-glucoside

[1-(N,N-diethylcarbamido)-phenyl]-2′-butyramido-
3′,4′,6′-tri-O-(2-acetoxy-6-fluorobenzoyl)-2′-deoxy-β-
D-galactoside

[1-(N-propylcarbamido)-phenyl]-2′-butyramido-
3′,4′,6′-tri-O-(2′-acetoxy-5-benzyloxybenzoyl)-2′-
β-D-glucoside

[1-(N-propylcarbamido)-phenyl]-2′-butyramido-
3′,4′,6′-tri-O-(2′-acetoxy-5-benzyloxybenzoyl)-2′-
β-D-galactoside

[1-(N,N-diphenylcarbamido)-phenyl]-2′-acetamido-
3′,4′,6′-tri-O-(2-acetoxybenzoyl)-2′-deoxy-
β-D-glucoside

[1-(N,N-diphenylcarbamido)-phenyl]-2′-acetamido-
3′,4′,6′-tri-O-(2-acetoxybenzoyl)-2′-deoxy-
β-D-galactoside

[1-(N-methyl-N-phenylcarbamido)-phenyl]-2′-
propionamido-3′,4′,6′-tri-O-[1-acetoxy-4-(4′-
fluorophenyl)-benzoyl]-2′-deoxy-β-D-glucoside

[1-(N-methyl-N-phenylcarbamido)-phenyl]-2′-
propionamido-3′,4′,6′-tri-O-[1-acetoxy-4-(4′-
fluorophenyl)-benzoyl]-2′-deoxy-β-D-galactoside

[1-(N,N-dibenzylcarbamido)-phenyl]-2-acetamido-
3′,4′,6′-tri-O-(2-butoxy-4-trifluoromethylbenzoyl)-
2′-deoxy-β-D-glucoside

[1-(N,N-dibenzylcarbamido)-phenyl]-2-acetamido-
3′,4′,6′-tri-O-(2-butoxy-4-trifluoromethylbenzoyl)-
2′-deoxy-β-D-galactoside 1-carbamidophenyl-2′-acetamido-3′,4′,6′-tri-O-
(2-propionoxybenzoyl)-2′-deoxy-β-D-glucoside 1-carbamidophenyl-2′-acetamido-3′,4′,6′-tri-O-
(2-propionoxybenzoyl)-2′-deoxy-β-D-galactoside

[1-(N,N-dimethylcarbamido)-phenyl]-2′-acetamido-
3′,4′,6′-tri-O-(2-acetoxybenzoyl)-2′-deoxy-
β-D-glucoside

[1-(N,N-dimethylcarbamido)-phenyl]-2′-acetamido-
3′,4′,6′-tri-O-(2-acetoxybenzoyl)-2′-deoxy-
β-D-galactoside

[1-(N,N-dipropylcarbamido)-phenyl]-2′-acetamido-
3′,4′,6′-tri-O-(2-acetoxybenzoyl)-2′-deoxy-
β-D-glucoside

[1-(N,N-dipropylcarbamido)-phenyl]-2′-acetamido-
3′,4′,6′-tri-O-(2-acetoxybenzoyl)-2′-deoxy-
β-D-galactoside Example 22.—(Ortho-carboxyphenyl)-2′-amino-2′-deoxy-β-D-glucoside A mixture of 4.25 g. (10.4 mole) of the compound of the previous example, 40 ml. of water and 30 ml. of 1 N sodium hydroxide is stirred at room temperature for 2.5 hours. After cooling the clear solution in ice, the pH is brought to 3.5 by the addition of about 25 ml. of 1 N hydrochloric acid. The solution is concentrated to dryness in vacuo below 30°. The residue is dissolved in 15–20 ml. of water and applied to a column of 50 ml. of IR-120 resin on the hydrogen cycle. (This resin is a sulfonic resin available from Rohm & Haas of Philadelphia, Pa.) The column is eluted with water until a negative test for chloride ion is obtained (150 ml.), and then with 1% ammonium hydroxide until no more product is removed (375 ml.).

The ammonia eluates are concentrated to dryness in vacuo and the residue recrystallized from aqueous acetone to yield the desired product.

The sodium salt of this compound is prepared by freeze drying the hydrolysis mixture after stirring at room temperature for 2.5 hours.

The following compounds are similarly prepared, the potassium salts by the replacement of sodium hydroxide with potassium hydroxide.

(1-carboxy-6-methylphenyl)-2′-amino-2′-deoxy-β-D-glucoside (1-carboxy-6-methylphenyl)-2′-amino-2′-deoxy-β-D-galactoside (1-carboxy-4-trifluoromethylphenyl)-2′-amino-2′-deoxy-β--D-glucoside (1-carboxy-4-trifluoromethylphenyl)-2′-amino-2′-deoxy-β-D-galactoside (1-carboxy-3-fluorophenyl)-2′-amino-2′-deoxy-β-D-glucoside (1-carboxy-3-fluorophenyl)-2′-amino-2′-deoxy-β-D-galactoside (1-carboxy-2-fluorophenyl)-2′-amino-2′-deoxy-β-D-glucoside (1-carboxy-2-fluorophenyl)-2′-amino-2′-deoxy-β-D-galactoside (1-carboxy-3-benzyloxyphenyl)-2′-amino-2′-deoxy-β-D-glucoside (1-carboxy-3-benzyloxyphenyl)-2′-amino-2′-deoxy-β-D-galactoside (1-carboxy-3-phenylphenyl)-2'-amino-2'-deoxy-β-D-glucoside
(1-carboxy-3-phenylphenyl)-2'-amino-2'-deoxy-β-D-galactoside
[1-carboxy-3-(4'-fluorophenyl)-phenyl]-2'-amino-2'-deoxy-β-D-glucoside
[1-carboxy-3-(4'-fluorophenyl)-phenyl]-2'-amino-2'-deoxy-β-D-galactoside
[1-carboxy-3-(2'-fluorophenyl)-phenyl]-2'-amino-2'-deoxy-β-D-glucoside
[1-carboxy-3-(2'-fluorophenyl)-phenyl]-2'-amino-2'-deoxy-β-D-galactoside
[1-carboxy-3-(3'-fluorophenyl)-phenyl]-2'-amino-2'-deoxy-β-D-glucoside
[1-carboxy-3-(3'-fluorophenyl)-phenyl]-2'-amino-2'-deoxy-β-D-galactoside
[1-carboxy-3-(2'-4'-difluorophenyl)-phenyl]-2'-amino-2'-deoxy-β-D-glucoside
[1-carboxy-3-(2'-4'-difluorophenyl)-phenyl]-2'-amino-2'-deoxy-β-D-galactoside Acid addition salts such as the hydrochloride, hydrobromide, citrate, tartrate, acetate, propionate, and phosphate are prepared by taking up the free base in an aqueous solution of the selected acid containing an equimolar quantity of the acid and freeze drying or, alternatively, by using a similar methanol solution of the selected acid and evaporating the solvent.

Example 23.—(Ortho-carbomethoxyphenyl)-2'-amino-2'-deoxy-β-D-glucoside

A total of 5 mM. of the product prepared in the previous example is taken up in an equimolar quantity of ammonium hydroxide at room temperature and 5.1 mM. of 10% aqueous silver nitrate is added. The silver salt precipitates. It is recovered by filtration and carefully dried. The silver salt is then taken up in 50 ml. anhydrous ether and 5 mM. of methyl chloride dissolved in 10 ml. is added. It is then refluxed for one-half hour, cooled and filtered to remove the silver chloride. The solvent is removed in vacuo to obtain the desired product.

The following esters are similarly prepared from the appropriate alkali aryl or aralkyl chloride:

| | |
|---|---|
| ethyl | p-butyl |
| propyl | phenyl |
| butyl | p-methylphenyl |
| benzoyl | 4-ethylbenzyl |

Example 24.—(Ortho-carbomethoxyphenyl) - 2' - (ortho-acetoxybenzoylamido) - 3',4',6' - tri - O - (ortho-acetoxybenzoyl)-β-D-glucoside This compound is prepared in accordance with the procedure of Example 20 except that 100 mM. of acetyl salicyloyl chloride is employed.

The following compounds are similarly prepared. Only methyl esters are listed. However, analogous compounds are prepared from the other esters prepared in accordance with Example 23.

(1-carbomethoxy - 6 - methylphenyl)-2'-ortho-acetoxybenzoylamido - 3',4',6' - tri - O - acetyl - 2' - deoxy-β-D-glucoside
(1-carbomethoxy - 6 - methylphenyl)-2'-ortho-acetoxybenzoylamido - 3',4',6' - tri - O - acetyl - 2' - deoxy-β-D-galactoside
(1-carbomethoxy - 4 - trifluoromethylphenyl)-2'-ortho-acetoxybenzoylamido - 3',4',6' - tri - O - butyryl - 2'-deoxy-β-D-glucoside
(1-carbomethoxy - 4 - trifluoromethylphenyl)-2'-ortho-acetoxybenzoylamido - 3',4',6' - tri - O - butyryl - 2'-deoxy-β-D-galactoside
(1-carbomethoxy - 4 - trifluoromethylphenyl)-2'-ortho-acetoxybenzoylamido - 3',4',6' - tri - O - butyryl - 2'-deoxy-β-D-galactoside
(1-carbomethoxy-3-fluorophenyl)-2'-(ortho-acetoxybenzoylamido)-3',4',6'-tri-O-acetyl-2'-deoxy-β-D-glucoside
(1-carbomethoxy-3-fluorophenyl)-2'-(ortho-acetoxybenzoylamido)-3',4',6'-tri-O-acetyl-2'-deoxy-β-D-galactoside
(1-carbomethoxy-2-fluorophenyl)-2'-(ortho-acetoxybenzoylamido)-3',4',6'-tri-O-acetyl-2'-deoxy-β-D-glucoside
(1-carbomethoxy-2-fluorophenyl)-2'-(ortho-acetoxybenzoylamido)-3',4',6'-tri-O-acetyl-2'-deoxy-β-D-galactoside
(1-carbomethoxy-3-benzyloxyphenyl)-2'-(ortho-acetoxybenzoylamido)-3',4',6'-tri-O-acetyl-2'-deoxy-β-D-glucoside
(1-carbomethoxy-3-benzyloxyphenyl)-2'-(ortho-acetoxybenzoylamido)-3',4',6'-tri-O-acetyl-2'-deoxy-β-D-galactoside
(1-carbomethoxy-3-phenylphenyl)-2'-(ortho-acetoxybenzoylamido)-3',4',6'-tri-O-propionyl-2'-deoxy-β-D-glucoside
(1-carbomethoxy-3-phenylphenyl)-2'-(ortho-acetoxybenzoylamido)-3',4',6'-tri-O-propionyl-2'-deoxy-β-D-galactoside
[1-carbomethoxy-3-(4'-fluorophenyl)-phenyl]-2'-(ortho-acetoxybenzoylamido)-3',4',6'-tri-O-acetyl-2'-deoxy-β-D-glucoside
[1-carbomethoxy-3-(4'-fluorophenyl)-phenyl]-2'-(ortho-acetoxybenzoylamido)-3',4',6'-tri-O-acetyl-2'-deoxy-β-D-galactoside
[1-carbomethoxy-3-(2'-fluorophenyl)-phenyl]-2'-(ortho-acetoxybenzoylamido)-3',4',6'-tri-O-acetyl-2'-deoxy-β-D-glucoside
[1-carbomethoxy-3-(2'-fluorophenyl)-phenyl]-2'-(ortho-acetoxybenzoylamido)-3',4',6'-tri-O-acetyl-2'-deoxy-β-D-galactoside
[1-carbomethoxy-3-(3'-fluorophenyl)-phenyl]-2'-(ortho-acetoxybenzoylamido)-3',4',6'-tri-O-acetyl-2'-deoxy-β-D-glucoside
[1-carbomethoxy-3-(3'-fluorophenyl)-phenyl]-2'-(ortho-acetoxybenzoylamido)-3',4',6'-tri-O-acetyl-2'-deoxy-β-D-galactoside
[1-carbomethoxy-3-(2'-4-difluorophenyl)phenyl]-2'-(ortho-acetoxybenzoylamido)-3',4',6'-tri-O-acetyl-2'-deoxy-β-D-glucoside
[1-carbomethoxy-3-(2'-4-difluorophenyl)phenyl]-2'-(ortho-acetoxybenzoylamido)-3',4',6'-tri-O-acetyl-2'-deoxy-β-D-galactoside.

In addition to methyl esters the following esters of the above named compounds are similarly prepared utilizing the appropriate ester of salicyclic acid or derivative thereof as starting compounds:

| | |
|---|---|
| benzyl | 4-methylbenzyl |
| ethyl | hexyl |
| propyl | p-methylphenyl |
| tert-butyl | 4-trifluoromethylbenzyl |
| phenyl | isopropyl |

The Ring A unsaturated 11,17-bis-oxygenated-16-methyl-20-keto-pregnane 21-free alcohols, more particularly, the 16α- and 16β-methyl derivatives of cortison and hydrocortisone, their $\Delta^1$ derivatives, 6-methyl and 6-methyl $\Delta^6$ derivatives of the foregoing, and [3,2-c] pyrazolo-analogues thereof, used as starting materials in the foregoing examples, are prepared in accordance with the following procedures:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3α-acetoxy-16-pregnene-11,20-dione in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. pyridine and the acetylated product is purified by chromatography on acid-washed alumina followed by crystallization from petroleum ether to give approximately 1.5 g. of substantially pure 3α-acetoxy-16α-methyl-pregnane-11,20-dione.

To a solution of 0.8 g. of 3α-acetoxy-16α-methyl-pregnane-11,20-dione in 40 ml. of methanol is added 1.5 ml. of concentrated aqueous hydrochloric acid and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 3α-hydroxy-16α-methyl-pregnane-11,20-dione.

A solution of 22 g. of 3α-acetoxy-16α-methyl-pregnane-11,20-dione and 1 g. of p-toluene-sulfonic acid in 250 ml. of acetic anhydride is heated at reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 660 g. of acid-washed alumina; the alumina adsorbate is then washed with 2 liters of petroleum ether. The adsorbate is then eluted with 85:15 petroleum ether-ether mixture, and the first four liters of eluate is collected, and evaporated to dryness in vacuo to give a mixture of enol acetates containing 3α,20-diacetoxy-16α-methyl-17(20)-pregnene-11-one. This mixture of enolates, weighing approximately 14 g., is dissolved in 50 ml. of benzene and treated with an excess of per-benzoic acid over a 16-hour period. The reaction mixture is shaken with dilute aqueous potassium hydroxide solution until the benzene layer is free of per-benzoic acid; the benzene layer is then washed with water until neutral, dried, and the solvent evaporated in vacuo to give a crystalline material, 17α,20-epoxy-3α,20-diacetoxy-16α-methyl-pregnane-11-one. The latter material is dissolved, without purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 3α,17α-dihydroxy-16α-methyl-pregnane-11,20-dione.

To a solution of 7.0 g. of 3α,17α-dihydroxy-16α-methyl-pregnane-11,20-dione in 50 ml. of chloroform is added dropwise with stirring a solution containing 3.36 g. of bromine in 24.2 ml. of chloroform over a period of about 60 minutes. The reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed, by slurrying, with 50:50 ether-petroleum ether mixture to give about 5 g. of 21-bromo - 3α,17α-dihydroxy - 16α-methyl-pregnane-11,20-dione.

This 5 g. of 21-bromo-3α,17α-dihydroxy-16α-methyl-pregnane-11,20-dione is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the residual material is slurried with water, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl-acetate-ether to give 3α,17α,21-trihydroxy-16α-methyl-pregnane - 11,20-dione 21-acetate.

A solution of 400 mg. of 3α,17α,21-trihydroxy-16α-methyl-pregnane-11,20-dione 21-acetate in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate to give 17α,21-dihydroxy-16α-methyl-pregnane-3,11,20-trione 21-acetate.

To 100 mg. of 17α,21-dihydroxy-16α-methylpregnane-3,11,20-trione 21-acetate dissolved in 2 ml. of chloroform and 2.25 ml. of glacial acetic acid, at a temperature of −55° C., is added two drops of a 0.001 N solution of dry HBr in glacial acetic acid. To about 0.38 ml. of 0.001 N HBr in glacial acetic acid, at −55° C., is added 0.43 ml. of a solution containing 40 mg. of bromine in chloroform, and the resulting solution is added, over about a 10-minute period, to the solution of the steroid, while maintaining the reaction mixture at about −55° C. The reaction mixture is allowed to stand at −55° C. for about one-half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution, and the crystalline material which separates is recovered and dried to give approximately 90 mg. of 4-bromo-17α,21-dihydroxy-16α-methyl-pregnane-3,11,20-trione acetate.

A mixture of 48 mg. of semicarbazide, 48 mg. of 4 - bromo - 17α,21 - dihydroxy - 16α - methyl - pregnane-3,11,20-trione 21-acetate and 0.6 ml. of ethanol is heated under reflux in contact with a nitrogen atmosphere for a period of about three days, and the reaction solution is evaporated to a small volume, diluted with water and the crystalline material recovered and purified by recrystallization from aqueous methanol to give 3,20-bis-semicarbazide - 17α,21 - dihydroxy - 16α - methyl - 4 - pregnene-3,11,20-trione 21-acetate. Fifty milligrams of 3,20-bis - semicarbazide - 17α,21 - dihydroxy - 16α - methyl - 4 - pregnene-3,11,20-trione 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 3,20-bis-semicarbazide - 17α,21 - dihydroxy - 16α - methyl - 4 - pregnene-3,11,20-trione.

A mixture of 60 mg. of 3,20-bis-semicarbazide-17α,21-dihydroxy-16α-methyl-4-pregnene-3,11,20-trione, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 17α,21-dihydroxy-16α-methyl-4-pregnene-3,11,20-trione.

A solution of 45 mg. of 3,20-bis-semicarbazide-17α,21-dihydroxy-16α-methyl-4-pregnene-3,11,20-trione 21 - acetate, 17 mg. of sodium borohydride, 1 ml. of tetrahydrofuran and 1.3 ml. of water is maintained at reflux temperature for approximately one hour. The reaction solution is cooled to about 15° C., and the excess sodium borohydride decomposed by the addition of a solution of 27 mg. of glacial acetic acid in 0.2 ml. of water. The tetrahydrofuran is evaporated in vacuo, and the residual material is extracted with ethyl acetate. The ethyl acetate extracts are washed with a saturated salt solution, water, 5% aqueous sodium bicarbonate solution and again with water. The extracts are dried and the ethyl acetate evaporated in vacuo to give 3,20-bis-semicarbazido-11β,17α,21-trihydroxy-16α-methyl-4-pregnene-3,20-dione.

A mixture of 60 mg. of 3,20-bis-semicarbazido-11β,17α,21-trihydroxy-16α-methyl-4-pregnene-3,20-dione, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 11β,17α,21-trihydroxy-16α-methyl-4-pregnene-3,20-dione. The latter material is reacted with an excess of acetic anhydride in pyridine at room temperature for a period of about fifteen hours, and the crude acetylated product is recrystallized from ethyl acetate to give 11β,17α,21-trihydroxy-16α-methyl-4-pregnene-3,20-dione 21-acetate.

To a cooled solution of 600 mg. of 11β,17α,21-trihydroxy-16α-methyl-4-pregnene-3,20-dione 21-acetate in 5.0 ml. of dry pyridine is added 1.15 ml. of phosphorous oxychloride, and the mixture is allowed to stand at room temperature for a period of approximately 15 hours. The reaction solution is evaporated in vacuo at a temperature of about 20° C. to a volume of 2–3 ml. Seventeen milliliters of water is added slowly to the concentrated solution, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo, the residual material is triturated with ether, and the crystalline material is recrystallized from ethyl acetate-ether to give 17α,21-dihydroxy-16α-methyl-4,9(11)-pregnadiene-3,20-dione 21-acetate. A suspension of 330 mg. of 17α,21-dihydroxy-16α-methyl-4,9(11)-pregnadiene-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours during which time the solid material slowly dissolves. The resulting yellow solution is treated with 1.0 ml. of allyl alcohol to discharge the color and decompose the remaining N-bromo-succinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-11β,17α,21-trihydroxy-16α-methyl-4-pregnene-3,20-dione 21-acetate.

A solution of 210 mg. of 9α-bromo-11β,17α-21-trihydroxy-16α-methyl-4-pregnene-3,20-dione 21-acetate and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, evaporated to dryness in vacuo. The residual material is crystallized from ethyl acetate-ether to give 9β,11β-epoxy-17α,21 - dihydroxy - 16α - methyl - 4 pregnene-3,3,20-dione 21-acetate. To a solution of 83 mg, of anhydrous hydrogen fluoride in 4.7 ml. of ice-cold alcohol-free chloroform is added an ice-cold solution of 4.16 mg. of 9β,11β - epoxy - 17α,21 - dihydroxy - 16α - methyl - 4 - pregnene-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 9α-fluoro - 11β,17α,21 - trihydroxy - 16α - methyl - 4 - pregnene-3,20-dione 21-acetate. Fifty milligrams of 9α-fluoro-11β,17α,21 - trihydroxy - 16α - methyl - 4 - pregnene - 3,20-dione 21-acetate is dissolved in a mixture of 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro - 11β,17α,21 - trihydroxy - 16α - methyl - 4 - pregnene-3,20-dione.

A solution of 400 mg. of 9α-fluoro-11β,17α,21-trihydroxy 16α-methyl-4-pregnene-3,20-dione 21-acetate in 4 ml. of pyridine is added to the complex formed by the addition of 400 mg. of chromium tri-oxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate-ether to give 9α-fluoro-17α,21-dihydroxy-16α-methyl-4-pregnene-3,11,20-trione 21-acetate. Fifty milligrams of 9α - fluoro - 17α,21 - dihydroxy - 16α - methyl - 4 - pregnene-3,11,20-trione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-17α,21-dihydroxy-16α-methyl-4-pregnene-3,11,20-trione.

To a solution of 110 mg. of 17α,21-dihydroxy-16α-methyl - 4 - pregnene-3,11,20-trione 21-acetate in 6 ml. t-butanol, 0.01 ml. glacial acetic acid and 0.03 ml. of acetic anhydride is added 70 mg. of selenious acid ($H_2SeO_3$). The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 17α,21-dihydroxy-16α-methyl-1,4-pregnadiene-3,11,20-trione 21 - acetate; M.P. 208–212° C. Fifty milligrams of 17α,21-dihydroxy-16α-methyl-1,4-pregnadiene-3,11,20-trione 21 acetate is dissolved in a mixture of 1.0 cc. of benzene and 1.0 cc. of 1 n methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 17α,21-dihydroxy - 16α - methyl-1,4-pregnadiene-3,11,20-trione.

To a solution of 110 mg. of 9α-fluoro-17α,21-dihydroxy-16α-methyl-4-pregnene-3,11,20-trione 21-acetate in 6 ml. t-butanol, 0.01 ml. glacial acetic acid and 0.03 ml. of acetic anhydride is added 70 mg. of selenious acid ($H_2SeO_3$). The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed on activated alumina. It is eluted with ether-petroleum ether and then with mixtures of ether and chloroform, increasingly rich in chloroform. The 4:6 ether-chloroform eluates are combined, evaporated to dryness, and the residual material recrystallized from ethyl acetate ether to give 9α-fluoro - 17α,21 - dihydroxy - 16α - methyl-1,4-pregnadiene - 3,11,20 - trione 21-acetate. Fifty milligrams of 9α - fluoro - 17α,21 - dihydroxy-16α-methyl-1,4-pregnadiene-3,11,20-trione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-17α,21-dihydroxy-16α-methyl-1,4-pregnadiene-3,11,20-trione.

To a solution of 100 mg. of 11β,17α,21-trihydroxy-16α - methyl-4-pregnene-3,20-dione 21-acetate in 6 ml. t-butanol, 0.01 ml. glacial acetic acid and 0.03 ml. of acetic anhydride is added 70 mg. of selenious acid. The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 11β,17α,21-trihydroxy-16α-methyl-1,4-pregnadiene-3,20-dione 21-acetate. Fifty milligrams of 11β,17α,21-trihydroxy-16α-methyl-1,4-pregnadiene-3,20-dione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 11β,17α,21-trihydroxy-16α-methyl-1,4-pregnadiene-3,20-dione.

To a solution of 100 mg. of 9α-fluoro-11β,17α,21-trihydroxy-16α-methyl-4-pregnene-3,20-dione 21-acetate in 6 ml. t-butanol, 0.01 ml. glacial acetic acid and 0.03 ml. of acetic anhydride is added 70 mg. of selenious acid. The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 9α-fluoro-11β,17α, 21-trihydroxy-16α-methyl-1,4-pregnadiene-3,20-dione 21-acetate. Fifty milligrams of 9α-fluoro-11β,17α,21-trihydroxy-16α-methyl-1,4-pregnadiene-3,20 - dione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-11β,17α,21-trihydroxy-16α-methyl-1,4-pregnadiene-3,20-dione.

In a 500 ml. 3-neck flask equipped with condenser, dropping funnel and nitrogen inlet are placed 20 g. of potassium hydroxide in 90 ml. of water, 100 ml. of methanol and 100 ml. of ether. A solution of 10 g. of N-methyl-N-nitrosotosylamide in 50 ml. of ether is placed in the dropping funnel.

Diazomethane is generated by warming the generation flask to 40–45° C. and cauiously adding the N-methyl-N-nitrosotosylamide-ether from the dropping funnel. Nitrogen is utilized to sweep the diazomethane into a solution of 20 g. of 3α-acetoxy 16-pregene-11,20-dione in 100 ml. of tetrahydrofuran and 120 ml. of ether. The process is continued until the steroid solution remains yellow for several hours. The product, 3α-acetoxy-16α,17α-methyleneazo-pregnane 11,20-dione largely precipitates from the reaction mixture. After 16 hours, the mixture is filtered, washed with ether and dried in air. Yield about 14 grams, M.P. 186–190° C.

37.4 g. of 3α-acetoxy-16α,17α-methyleneazo-pregnane-11,20-dione is placed in a 500 ml. round-bottom flask and heated by an oil bath in vacuo (pressure 0.6 mm.). A manometer and 12-liter surge flask are in the line between the reaction flask and pump trap. When the bath temperature reaches 180° C. the 3α-acetoxy-16α,17α-methyleneazo-pregnane-11,20-dione begins to melt with evolution of nitrogen. The maximum pressure reached is 83 mm. After 10 minutes at 180–182° C. the melt is cooled. It has

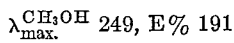 $\lambda_{max.}^{CH_3OH}$ 249, E% 191 and is taken up in about 150 ml. of acetone, filtered through diatomaceous earth, concentrated to about 100 ml., and ether is slowly added to the boiling solution until crystallization occurs. These crystals of 3α-acetoxy-16-methyl-16-pregnene-11,20-dione weigh about 19.0 g., M.P. 165–168° C.

A solution of 20.0 g. of 3α-acetoxy-16-methyl-16-pregnene-11,20-dione dissolved in 600 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25–30° C. for 40 minutes. The solution is kept at 15°–20° C. for 18 hours at which time the ultraviolet maximum at 249 has completely disappeared. Then 600 ml. of saturated salt water is slowly added, the crystalline precipitate is filtered, washed with water, and dried in air and in vacuum. The 16α,17α-epoxy-3α-hydroxy-16β-methyl-pregnane-11,20-dione thus formed weighs about 17 g.; M.P. 176–177° C. hexagonal prisms M.P. 178–180° C. from acetone-ether.

To a solution of 2.69 g. of 16α,17α-epoxy-3α-hydroxy-16β-methyl-pregnane-11,20-dione in 55 ml. dioxane is added 27 ml. of 2 M aqueous perchloric acid. The clear solution is kept at 25–30° C. for 65 hours. Cold water (175 ml.) is added, the slurry chilled to 8° C. and filtered after 30 minutes. The precipitate, containing a mixture of 3α,17α-dihydroxy-16-methyl-15-pregnene-11,20-dione and 3α,17α-dihydroxy-16-methylene-pregnane-11,20-dione is washed with water, and dried in air and finally at 50° C. in vacuum. Yield: approximately 2 g.; M.P. sintering at about 150° C., melting at 158–167° C. The relative proportion of 3α,17α-dihydroxy-16-methyl-15-pregnene-11,20-dione and 3α,17α-dihydroxy-16-methylene-pregnane-11,20-dione is estimated to be of the order of 1:1.

A solution 3.05 g. (8.47 millimol) of the olefin mixture of 3α,17α-dihydroxy-16-methylene-pregnane-11,20-dione in 80 ml. of methanol is reduced in hydrogen at 1 atmosphere and 25° C. in the presence of 2.0 g. of 25% palladium-calcium carbonate catalyst. Modification of the hydrogen conditions, pH, solvent, catalyst, etc. alters the isomer ratio significantly. Uptake of the calculated amount of hydrogen is complete in 45 minutes. The mixture is stirred an additional 30 minutes and filtered through diatomaceous earth. The colorless filtrate is taken to dryness and crystallied from ether; a mixture of 3α,17α-dihydroxy-16α-methyl-pregnane-11,20-dione and 3α,17α-dihydroxy-16β-methyl-pregnane-11,20-dione is obtained; weight about 3 g., sintering at 150° C. melting at 166–182° C.

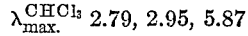 $\lambda_{max.}^{CHCl_3}$ 2.79, 2.95, 5.87

The product consists of 3α,17α-dihydroxy-16α-methyl-pregnane-11,20-dione and 3α,17α-dihydroxy-16β-methyl-pregnane-11,20-dione in the ratio ca. 7:3 as determined by the amounts of end product isolated below.

One gram of this hydrogenation product containing 3α,17α-dihydroxy-16α-methyl-pregnane-11,20-dione and 3α,17α-dihydroxy-16β-methyl-pregnane-11,20-dione, is chromatographed on 100 g. of activated magnesium silicate. The 100% chloroform eluates give 3α,17α-dihydroxy-16α-methyl-pregnane-11,20-dione, M.P. 188–191° C. The 5% methanol-chloroform eluates give 3α,17α-dihydroxy-16β-methyl-pregnane-11,20-dione, hexagonal plates from benzene-ethyl-acetate; M.P. 192–197° C.

A solution of 3.50 g. (9.7 millimol) of 3α,17α-dihydroxy-16β-methyl-pregnane-11,20-dione in 40 ml. of chloroform is warmed to 40–45° C. A solution of 1.76 g. (11 millimol) of bromine in 25 ml. of chloroform is edded dropwise to the stirred solution such that the color is not darker than pale yellow (ca. 2 drops/sec., total time—1 hour). The nearly colorless solution is cooled to 20° C. and 200 ml. of ether is added. The mixture is extracted with excess cold 5% potassium bicarbonate solution, sodium bisulfite solution, and water, and dried over magnesium sulfate. The colorless residue after removal of solvent, 21-bromo-3α,17α-dihydroxy-16β-methyl-pregnane-11,20-dione (about 4 grams) gives a positive tetrazolium test.

To 4.30 g. of 21-bromo-3α,17α-dihydroxy-16β-methyl-pregnane-11,20-dione in 90 ml. of acetone and 0.01 ml. of acetic acid is added 4.83 g. of anhydrous potassium acetate and 3.85 g. of potassium iodide. The stirred mixture is refluxed for 18 hours and concentrated on the water pump to a small volume. Water is added, the product extracted into ethyl acetate, and the organic extract dried over magnesium sulfate to give about 4 grams of a colorless foam that partly crystallizes from acetone-ether to give 3α,17α,21-trihydroxy-16β-methyl-pregnane-11,20-dione 21-acetate.

To a solution of 3α,17α,21-trihydroxy-16β-methyl-pregnane-11,20-dione 21-acetate (4.0 g.) in 100 ml. t-butanol and 20 ml. of water cooled to 10–15° C., is added 3.5 g. N-bromo-succinimide. The suspension is stirred at 15° C. until all the N-bromo-succinimide has dissolved (90 minutes). The reaction mixture is kept at 2° C. for about sixteen hours and at 25° C. for 2 hours. Sodium sulfite solution is added to destroy bromine and the mixture concentrated on the water pump to a low volume. A granular precipitate forms; water is added, the precipitate filtered and washed with water; chromatography on neutral alumina and elution with mixtures of chloroform and benzene gives 17α,21-dihydroxy-16β-methyl-pregnane-3,11,20-trione 21-acetate, M.P. 210–213° C.

To a stirred solution of 585 mg. of 17α,21-dihydroxy-16β-methyl-pregnane-3,11,20-trione 21-acetate in 10 ml. of acetic acid and 8 ml. of chloroform kept at 10° C. is added slowly 230 mg. of bromine in 6 ml. of chloroform. After addition is complete, 1.2 g. of sodium acetate in 7 ml. of cold water is added and the mixture is extracted with chloroform. The chloroform extract is washed with dilute potassium bicarbonate, water and dried over sodium sulfate. The residue is triturated with ether to give 480 mg. of crystalline 4-bromo-17α,21-dihydroxy-16β-methyl-pregnane-3,11,20-trione 21-acetate M.P. 165–170° C. dec.

To 583 mg. of 4-bromo-17α,21-dihydroxy-16β-methyl-pregnane-3,11,20-trione 21-acetate in 20 ml. of acetonitrile under nitrogen is added a slurry of 600 mg. of semicarbazide hydrochloride and 410 mg. sodium bicarbonate in 4 ml. of water. After 2 hours, the acetonitrile is removed in vacuo, water is added and about 540 mg. of crystalline 3-semicarbazone of 17α,21-dihydroxy-16β-methyl-4-pregnene-3,11,20-trione 21-acetate filtered, washed with water and dried.

540 mg. of the 3-semicarbazone of 17α,21-dihydroxy-16β-methyl-4-pregnene-3,11,20-trione 21-acetate is dissolved in 20 ml. of acetic acid, 1.5 ml. of pyruvic acid and 5 ml. of water. After 18 hours at 25° C., water is added and the mixture extracted with chloroform. The chloroform extract is washed with aqueous potassium bicarbonate, water and dried over sodium sulfate. Removal of solvent gives crude 17α,21-dihydroxy-16β-methyl-4-pregnene-3,11,20-trione 21-acetate which is purified by chromatography on neutral alumina and crystallization from acetone-ether (hexagonal plates). The pure material has M.P. 226–232° C. 100 mg. of 17α,21-dihydroxy-16β-methyl-4-pregnene-3,11,20-trione 21-acetate in 3 ml. of methanol is treated with 0.1 g. of potassium bicarbonate in 1 ml. of water, the methanol is evaporated in vacuo, and the residual material is extracted with ethyl acetate. Evaporation of the ethyl acetate solution gives crystalline 17α,21-dihydroxy-16β-methyl-4-pregnene-3,11,20-trione.

To a stirred solution of 500 mg. of 17α,21-dihydroxy-16β-methyl-4-pregnane-3,11,20-trione 21-acetate in 12.5 ml. of methanol and 3 ml. of dimethylformamide kept under nitrogen is added a slurry of 680 mg. of semicarbazide hydrochloride and 370 mg. of sodium bicarbonate in 1 ml. of water. The stirred mixture is refluxed 3½ hours and maintained at 45° C. for 17 hours. It is then cooled to 20° C. and 50 ml. of 50% saturated aqueous sodium chloride is added. After 2 hours at 0° C. the precipitate of 3,20-bis-semicarbazido-17α,21-dihydroxy-16β-methyl-4-pregnene-3,11,20-trione 21-acetate is filtered, washed with water until free of chloride ion and dried in air.

To a stirred solution of 600 mg. of 3,20-bis-semicarbazido - 17α,21-dihydroxy-16β-methyl-4-pregnene-3,11,20-trione 21-acetate in 30 ml. of tetrahydrofuran and 11 ml. of water under nitrogen is added 200 mg. powdered sodium borohydride. The stirred suspension is refluxed 45 minutes and then cooled to 15° C. Aqueous acetic acid (3 ml. of 30%) is added cautiously and most of the tetrahydrofuran is removed in vacuum. Addition of 5 ml. of methanol and 5 ml. of water induces the product to crystallize. Following addition of 10 ml. of a saturated sodium chloride solution and aging at 0° C. the product 3,20-bis-semicarbazido - 11β,17α,21-trihydroxy-16β-methyl-4-pregnene-3,20-dione is filtered, washed with water, and dried in air.

To a solution of 510 mg. of reduced 3,20-bis-semicarbazido - 11β,17α,21 - trihydroxy - 16β-methyl-4-pregnene-3,20-dione in 5 ml. of acetic acid is added 1.20 ml. of water and 0.50 ml. of pyruvic acid. The solution is kept at 25° C. for eighteen hours. Water (20 ml.) is added, and the mixture is extracted thoroughly with chloroform. The chloroform extract is dried over magnesium sulfate and taken to dryness. The residue is crystallized from acetone-ether to give pure 11β,17α,21-trihydroxy-16β-methyl-4-pregnene-3,20-dione. A solution of 100 mg. of 11β,17α,21-trihydroxy-16β-methyl-4-pregnene-3,20-dione in 1.0 ml. of pyridine and 0.5 ml. of acetic anhydride is prepared. After 18 hours at 25° C., the solution is taken to dryness in vacuo and the solid residue purified by crystallization from acetone-ether to give 11β,17α,21-trihydroxy-16β-methyl-4-pregnene-3,20-dione 21-acetate.

A solution of 400 mg. of 11β,17α,21-trihydroxy-16β-methyl-4-pregnene-3,20-dione 21-acetate in 2.0 ml. dimethyl formamide, 0.8 ml. of pyridine and 0.4 ml. of methanesulfonyl chloride is kept at 75° C. for one hour. The mixture is cooled, water added, and the precipitate filtered, washed with water and dried in air. The desired 17α,21 - dihydroxy-16β-methyl-4,9(11)-pregnadiene-3,20-dione 21-acetate is purified by chromatography on alumina (20 g.) and elution of the column with benzene. Crystallization of material eluted by benzene gives pure 17α,21-dihydroxy - 16β - methyl - 4,9(11)-pregnadiene-3,20-dione 21-acetate.

To a mixture of 620 mg. of 17α,21-dihydroxy-16β-methyl-4,9(11)-pregnadiene-3,20-dione 21-acetate and 330 mg. of N-bromo-succinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and crystalline bromohydrin, 9α-bromo-11β,17α,21-trihydroxy - 16β-methyl-4-pregnene-3,20-dione 21-acetate, is filtered, washed with water, and dried in air.

To a stirred solution of 100 mg. of the 9α-bromo-11β,17α,21 - trihydroxy-16β-methyl-4-pregnene-3,20-dione 21-acetate in 3 ml. of tetrahydrofuran and 1 ml. of methanol under nitrogen is added 1.02 ml. of 0.215 N methanolic sodium methoxide. After 10 minutes at 25° C., 0.2 ml. of acetic acid is added and the methanol removed in vacuo. The residue is acetylated with 1.00 ml. of pyridine and 0.5 ml. of acetic anhydride at 60° C. for 70 minutes. The mixture is taken to dryness in vacuo, water added, and the product extracted into chloroform. The residue is crystallized from ether-acetone to give pure 9β,11β-epoxy-17α, 21 - dihydroxy - 16β-methyl-4-pregnene-3,20-dione 21-acetate.

To a solution of 200 mg. of 9β,11β-epoxy-17α,21-dihydroxy-16β-methyl-4-pregnene-3,20-dione 21-acetate in 2 ml. of chloroform and 2 ml. of tetrahydrofuran in a polyethylene bottle at 60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase washed with water and dried over magnesium sulfate. The residue on crystallization from acetone-ether gives pure 9α - fluoro-11β,17α,21-trihydroxy-16β-methyl-4-pregnene-3,20-dione 21-acetate.

To a stirred solution of 110 mg. of 9α-fluoro-11β,17α,21-trihydroxy-16β-methyl-4-pregnene-3,20-dione 21-acetate in 5 ml. of methanol under nitrogen at 25° C. is added 1.00 ml. of 0.26 M methanolic sodium methoxide. After 15 minutes, 0.2 ml. of acetic acid in 1 ml. of water is added and the mixture concentrated nearly to dryness. The residue is taken up in ethyl acetate and the ethyl acetate solution is washed with water, dried over magnesium sulfate, and concentrated to dryness. Crystallization of the residue from ethyl acetate gives pure 9α-fluoro-11β,17α,21-trihydroxy-16β-methyl-4-pregnene-3,20-dione.

To a solution of 100 mg. of 9β,11β-epoxy-17α,21-dihydroxy-16β-methyl-4-pregnene-3,20-dione 21-acetate in 4 ml. of chloroform is added 5 ml. of concentrated hydrochloric acid. The two-phase mixture is stirred at 25° C. for 1 hour. Addition of water and chloroform extraction gives a crude crystalline product which is partly deacetylated. Treatment with 1 ml. of pyridine and 0.5 ml. of acetic anhydride at 25° C. for 18 hours followed by concentration in vacuo and crystallization of the residue from acetone-ether affords pure 9α-chloro-11β,17α,21-trihydroxy-16β-methyl-4-pregnene-3,20-dione 21-acetate. This compound is hydrolyzed by treatment with potassium bicarbonate in aqueous methanol to give 9α-chloro-11β,17α, 21-trihydroxy-16β-methyl-4-pregnene-3,20-dione.

To a stirred solution of 682 mg. of 17α,21-dihydroxy-16β-methyl-pregnane-3,11,20-trione 21-acetate in 20 ml. of chloroform and 2.25 ml. of acetic acid maintained at −20° C. is added dropwise one-half of a solution of 540 mg. of bromine in 2 ml. of chloroform and 3 ml. of acetic acid. The mixture is warmed to 0° C. and the remainder of the bromine added. Sodium acetate (0.4 g.) in 2 ml. of water is added followed by 20 mg. of sodium sulfite. The mixture is concentrated in vacuo to remove the chloroform and 20 ml. of water is added. The white powdery precipitate of 2,4-dibromo - 17α,21 - dihydroxy-16β-methyl-pregnene-3,11,20-trione 21-acetate is filtered, washed with water and dried in air. Yield: 920 mg. M.P. 122–130° C. dec.

To a solution under nitrogen of 900 mg. of the 2,4-dibromo - 17α,21 - dihydroxy - 16β - methyl - pregnene-3,11,20-trione 21-acetate in 5 ml. dimethyl formamide is added 200 mg. of sodium bromide. After 1 hour at 25° C., 1 ml. of dimethylaniline is added and the mixture maintained at 135° C. for 2½ hours. The mixture is cooled, added dropwise to dilute hydrochloric acid, and solid crude product filtered, washed with dilute hydrochloric acid, water and dried in air. Treatment with charcoal, followed by crystallization from acetone gives 17α,21-dihydroxy - 16β - methyl-1,4-pregnadiene-3,11,20-trione 21-acetate; M.P. 230°–233° C.

1.0 g. of 17α,21-dihydroxy-16β-methyl-1,4-pregnadiene-3,11,20-trione 21-acetate in 30 ml. of methanol is treated with 1 g. of potassium bicarbonate in 10 ml. of water under nitrogen at reflux temperature for 7 minutes. The mixture is cooled, neutralized with 1 ml. of acetic acid in 10 ml. of water, the methanol removed in vacuo and the product extracted into ethyl acetate. Removal of the ethyl acetate gives crystals (about 0.9 g.) of the desired 17α,21-dihydroxy - 16β - methyl-1,4-pregnadiene-3,11,20-trione; M.P. 195°–200° C.

To 100 mg. of 11β,17α,21-trihydroxy-16β-methyl-4-pregnene-3,20-dione 21-acetate in 5 ml. of acetic acid is added 50 mg. of selenium dioxide. The mixture is refluxed under nitrogen 18 hours, 50 mg. of selenium dioxide is added and the mixture refluxed an additional 24 hours. The mixture is filtered, and the filtrate taken to dryness. The residue is taken up in ethyl acetate and washed successively with aqueous sodium bicarbonate, ammonium sulfide, dilute ammonia water, water, dilute hydrochloric acid and water and dried over magnesium sulfate. It is then treated with activated charcoal and concentrated to dryness. Crystallization of the residue from acetone-ether gives pure 11β,17α,21-trihydroxy-16β-methyl-1,4-pregnadiene-3,20-dione 21-acetate. 100 mg. of 11β,17α,21-trihydroxy-16β-methyl-1,4-pregnadiene-3,20-dione 21 - acetate in 3 ml. of methanol is treated with 0.1 g. of potassium bicarbonate in 10 ml. of water under nitrogen at reflux temperature for 7 minutes. The mixture is cooled, neutralized with 0.1 ml. of acetic acid in 1 ml. of water, the methanol is evaporated in vacuo and the residual material is extracted with ethyl acetate. Evaporation of the ethyl acetate gives crystalline 11β,17α,21-trihydroxy-16β-methyl-1,4-pregnadiene-3,20-dione.

In a similar manner, 100 mg. of 9α-fluoro-11β,17α,21-trihydroxy-16β-methyl-4-pregnene-3,20-dione 21 - acetate is treated with selenium dioxide to produce the corresponding 9α-fluoro - 11β,17α,21 - trihydroxy-16β-methyl-1,4-pregnadiene-3,20-dione 21-acetate. This compound is hydrolyzed with potassium bicarbonate in aqueous methanol in accordance with the procedure described in the preceding paragraph to give 9α-fluoro-11β,17α,21-trihydroxy - 16β-methyl-1,4-pregnadiene-3,20-dione. Similarly, 100 mg. of 9α-chloro-11β,17α,21-trihydroxy-16β-methyl-4-pregnene-3,20-dione 21-acetate is treated with selenium dioxide to produce 9α-chloro-11β,17α,21-trihydroxy-16β-methyl - 1,4 - pregnadiene-3,20-dione 21-acetate, which is hydrolyzed by treatment with potassium bicarbonate in aqueous methanol to give 9α - chloro - 11β,17α,21 - trihydroxy-16β-methyl-1,4-pregnadiene-3,20-dione.

A solution of 100 mg. of 9α-fluoro-11β,17α,21-trihydroxy-16β-methyl-1,4-pregnadiene-3,20-dione 21 - acetate in 1 ml. of pyridine is added to the complex formed by the addition of 100 mg. of chromium trioxide to 1 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulphuric acid at about 0° C., and then with water until neutral. The organic solvent layer is then dried, the solvents are evaporated therefrom in vacuo, and the residual crystalline material is purified by crystallization from ethyl acetate-ether to give 9α - fluoro-17α,21-dihydroxy-16β-methyl-1,4-pregnadiene-3,11,20-trione 21-acetate. This compound is hydrolyzed by treatment with potassium bicarbonate in aqueous methanol to form 9α-fluoro-17α,21-dihydroxy-16β-methyl-1,4-pregnadiene-3,11,20-trione.

In a similar manner, 9α-chloro-11β,17α,21-trihydroxy-16β-methyl-1,4-pregnadiene-3,20-dione 21-acetate is reacted with chromium trioxide-pyridine complex to give 9α - chloro-17α,21-dihydroxy - 16β - methyl-1,4-pregnadiene-3,11,20-trione 21-acetate, which is hydrolyzed by treatment with potassium bicarbonate in aqueous methanol to give 9α-chloro-17α,21-dihydroxy-16β-methyl-1,4-pregnadiene-3,11,20-trione.

Similarly, 9α-fluoro-11β,17α,21-trihydroxy-16β-methyl-4-pregnene-3,20-dione 21-acetate is reacted with chromium trioxide-pyridine complex to form 9α-fluoro-17α,-21 - dihydroxy-16β-methyl-4-pregnene-3,11,20-trione 21-acetate which is hydrolyzed by treatment with potassium bicarbonate in aqueous methanol to produce 9α-fluoro-17α,21-dihydroxy-16β-methyl-4-pregnene-3,11,20-trione.

Similarly, 9α-chloro-11β,17α,21-trihydroxy-16β-methyl-4-pregnene-3,20-dione 21-acetate is reacted with chromium trioxide-pyridine complex to form 9α-chloro-17α,-21 - dihydroxy-16β-methyl-4-pregnene-3,11,20-trione 21-acetate which is hydrolyzed by treatment with potassium bicarbonate in aqueous methanol to produce 9α-chloro-17α,21-dihydroxy-16β-methyl-4-pregnene-3,11,20-trione.

10 grams of 17α,21-dihydroxy-16α-methyl-4-pregnene-3,11,20-trione which can be prepared as described hereinabove, are dissolved in 400 cc. of chloroform. To this solution is added a mixture of 100 cc. of 37% aqueous formaldehyde solution. The resulting mixture is stirred for a period of approximately 3 days at room temperature. The chloroform layer is separated, washed with sodium bicarbonate solution until neutral, then with water, dried over anhydrous sodium sulfate, and evaporated to dryness in vacuo. The residual crude material is purified by crystallization from a mixture of methylene chloride and methanol to give 17α,20,20,21-bismethylenedioxy-16α-methyl-4-pregnene-3,11-dione.

10 grams of 17α,20,20,21-bismethylenedioxy-16α-methyl-4-pregnene-3,11-dione are dissolved in 500 cc. of benzene, to the solution is added 25 cc. of ethylene glycol and 1 gram of p-toluenesulfonic acid, and the resulting mixture is heated under reflux for a period of approximately 15 hours. The reaction solution is cooled, washed with aqueous sodium bicarbonate solution, dried over anhydrous sodium sulfate, and evaporated to dryness in vacuo. The residual crude material is absorbed from its solution in benzene on 250 g. of acid-washed alumina, and the resulting adsorbate is eluted utilizing mixtures of ether-petroleum ether to give 3-ethylenedioxy-17α,-20,20,21-bismethylenedioxy - 16α - methyl-5-pregnene-11-one.

A mixture of 10 grams of 3-ethylenedioxy-17α,20,20,21-bismethylenedioxy-16α-methyl-5-pregnene-11-one, 4.3 g. perbenzoic acid and 230 cc. benzene is allowed to stand at room temperature for a period of about 2 days. A portion of the epoxide product, which precipitates, is separated from the reaction solution by decantation, and the decanted solution is washed with saturated aqueous sodium bicarbonate solution and then dried over anhydrous sodium sulfate. The dried solution is then evaporated in vacuo, and the residual epoxide product is combined with the epoxide product originally separated from the reaction mixture.

The mixed epoxides are dissolved in 200 cc. of substantially anhydrous formic acid and the resulting solution is allowed to stand at room temperature for a period of about 2½ hours. The reaction solution is poured into water, and the aqueous mixture is extracted with chloroform. The chloroform solution is washed with saturated aqueous sodium bicarbonate solution, dried over anhydrous sodium sulfate, and evaporated in vacuo to give a mixture of 17α,20,20,21-bismethylenedioxy-5-hydroxy-16α-methyl-6-formyloxy - pregnene-3,11-dione and 17α,20,20,21 - bismethylenedioxy-6-hydroxy-16α-methyl-5-formyloxy-pregnene-3,11-dione.

This mixture of 5-formyloxy and 6-formyloxy derivatives is dissolved in about 850 cc. of methanol, to this solution is added a solution containing about 17 grams of potassium hydroxide in 80 cc. of water, and the resulting mixture is heated under reflux in a nitrogen atmosphere for a period of approximately ½ hour. The reaction solution is cooled, neutralized with about 23 cc. of acetic acid and evaporated in vacuo to a small volume. The concentrated solution is poured into water and the aqueous mixture is extracted with chloroform. The chloroform extract is washed with aqueous sodium bicarbonate solution, dried over anhydrous sodium sulfate, and evaporated to dryness in vacuo. The residual material is crystallized from methanol to give 17α,20,-

20,21-bismethylenedioxy-16α-methyl-allopregnene-3,6,11-trione.

A solution containing about 5 grams of 17α,20,20,21-bismethylenedioxy - 16α - methyl - allopregnene - 3,6,11-trione and 0.1 g. of p-toluenesulfonic acid in 120 cc. butanone dioxolane is heated under reflux for a period of about 10 minutes. The reaction solution is cooled to about 0-5° C., diluted with chloroform, and the resulting solution is washed with aqueous sodium bicarbonate solution and dried over anhydrous sodium sulfate. The resulting dried solution is evaporated to dryness in vacuo, and the residual material is slurried with ether, recovered by filtration and then dried to give 3-ethylenedioxy-17α,20,20,21 - bismethylenedioxy - 16α - methyl - allopregnene - 6,11-dione.

A solution containing about 5 grams of 3-ethylenedioxy-17α,20,20,21 - bismethylenedioxy - 16α - methyl - allopregnene-6,11-dione in 70 cc. of benzene is added, with stirring over a period of approximately 10 minutes, to an ethereal solution containing the methyl magnesimum iodide, prepared from 5 cc. of methyl iodide and 0.5 gram of magnesium turnings, dissolved in 50 cc. of ether. The reaction mixture is allowed to stir for an additional ½ hour period, and the resulting solution is decomposed with 70 cc. of water. About 170 cc. of benzene is added to the aqueous mixture and the layers are separated. The aqueous layer is extracted with two 100 cc.-portions of chloroform, and the organic layers are combined, dried over anhydrous sodium sulfate, and evaporated to dryness in vacuo to give 3-ethylenedioxy-17α,20,20,21-bismethylenedioxy - 6β - hydroxy - 6α,16α - dimethyl - allopregnene-11-one.

A solution containing 5.5 cc. of freshly distilled thionyl chloride in 26 cc. of cold anhydrous pyridine is added dropwise with stirring, to a solution of 5.0 g. of 3-ethylenedioxy - 17α,20,20,21 - bismethylenedioxy - 6β - hydroxy-6α,16α-dimethyl-allopregnene-11-one in 32 cc. of anhydrous pyridine, while maintaining the temperature of the reaction mixture at approximately 40° C. The reaction solution is stirred for an additional 30 minute period following the addition to the thionyl chloride reagent, and the reaction mixture is then cooled to about 0–5° C. and poured into 180 cc. ice water. The aqueous mixture is extracted with chloroform, and the chloroform extract is neutralized, dried over anhydrous sodium sulfate, and evaporated to dryness in vacuo. The residual material, dissolved in benzene, is chromatographed on 150 grams of acid-washed alumina; elution of the resulting adsorbate with mixtures of petroleum ether and ether gives 3-ethylenedioxy - 17α,20,20,21 - bismethylenedioxy - 6α,16α-dimethyl-5-pregnene-11-one.

A solution containing about 5 grams of 3-ethylenedioxy-17α,20,20,21 - bismethylenedioxy - 6α,16α - dimethyl - 5-pregnene-11-one, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21-bismethylenedioxy-6α,16α-dimethyl-4-pregnene-3,11-dione.

About 0.1 gram of 17α,20,20,21-bismethylenedioxy-6α,17α-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 17α,21 - dihydroxy - 6α,16α - dimethyl - 4 - pregnene - 3, 11,20-trione. The material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. poured into ice water. The aqueous suspension is extracted with chloroform, and the chloroform extract is washed with aqueous sodium bicarbonate solution, dried over anhydrous sodium sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then 50 cc. of a 3:7 mixture of ether-chloroform. The eluates are evaporated in vacuo, and the residual material is crystallized from methanol to give 17α,21-dihydroxy-6α-dimethyl-4-prengene-3,11,20-trione 21-acetate.

In accordance with the foregoing procedures, but starting with 17α,21 - dihydroxy - 16β - methyl - 4 - pregnene-3,11,20 - trione, there are obtained the corresponding 17α,21 - dihydroxy - 6α,16β - dimethyl - 4 - pregnene - 3, 11,20-trione and its 21-acetate.

To a solution of 100 mg. of 17α,21-dihydroxy-6α,16α-dimethyl-4-pregnene-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (supercel) to give 17α,21-dihydroxy-6α,16α-dimethyl-1,4-pregnadiene-3,11,20 - trione 21-acetate. 40 mg. of 17α,21-dihydroxy-6α,16α-dimethyl-1,4-pregnadiene-3,11,20-trione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, then benzene is evaporated in vacuo, and the residual material is purified by crystallization to give 17α,21-dihydroxy-6α,16α-dimethyl-1,4-pregnadiene-3,11,20-trione.

Similarly, in accordance with the foregoing procedure, but starting with 17α,21-dihydroxy-6α,16β-dimethyl-4-pregnene-3,11,20-trione 21-acetate, there are obtained the corresponding 17α,21 - dihydroxy - 6α,16β-dimethyl-1,4-pregnadiene-3,11,20-trione, and its 21-acetate.

About 5 grams of 3-ethylenedioxy-17α,20,20,21-bismethylenedioxy - 6α,16α - dimethyl - 5 - pregnene-11-one, which can be prepared as described hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21 - bismethylenedioxy-11β-hydroxy-6α,16α-dimethyl-5-pregnene.

A solution containing about 5 grams of 3-ethylenedioxy-17α,20,20,21-bismethylenedioxy-11β-hydroxy-6α,16α - dimethyl-5-pregnene, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21 - bismethylenedioxy - 11β-hydroxy-6α,16α-dimethyl-4-pregnene-3-one.

About 0.1 gram of 17α,20,20,21-bismethylenedioxy-11β-hydroxy-6α,16α-dimethyl-4-pregnene-3-one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 11β,17α,21-trihydroxy-6α,16α-dimethyl-1,4-pregnene-3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crytsallized from methanol to give 11β,17α,21-trihydroxy-6α,16α-dimethyl-4-pregnene-3,20-dione 21-acetate.

In accordance with the foregoing procedure, but starting with 3-ethylenedioxy-17α,20,20,21-bismethylenedioxy-6α,16β-dimethyl-5-pregnene-11-one (which is obtained as an intermediate in the preparation of 17α,21-dihydroxy-6α,16β-dimethyl-4-pregnene-3,11,20-trione 21-acetate herein described above) there are obtained the corresponding 11β,17α,21 - trihydroxy-6α,16β-dimethyl-4-pregnene-3,20-dione and its 21-acetate.

To a solution of 100 mg. of 11β,17α,21-trihydroxy-6α,16α-dimethyl-4-pregnene-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged and the clear benzene solution is evaporated in vacuo. The residual material thus obtained is separated using partition chromatography on diatomaceous silica (supercel) to give 11β,17α,21-trihydroxy-6α,16α-dimethyl-1,4-pregnadiene-3,20-dione 21-acetate. 45 mg. of 11β,17α,21-trihydroxy-6α,16α-dimethyl-1,4-pregnadiene-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, then benzene is evaporated in vacuo and the residual material is purified by crystallization to give 11β,17α,21-trihydroxy-6α,16α-dimethyl-1,4-pregnadiene-3,20-dione.

Similarly, in accordance with the foregoing procedures but starting with 11β,17α,21-trihydroxy-6α,16β-dimethyl-4-pregnene-3,20-dione 21-acetate, there are obtained the corresponding 11β,17α,21-trihydroxy-6α,16β-dimethyl-1,4-pregnadiene-3,20-dione, and its 21-acetate.

To a cooled solution of 436 mg. of 11β,17α,21-trihydroxy-6α,16α-dimethyl-4-pregnene-3,20-dione 21 - acetate (which can be prepared as described hereinabove) in 2.5 cc. dimethyl formamide and 2.0 ml. of dry pyridine is added 1.0 ml. of methane sulfonyl chloride, while maintaining the temperature below 0° C. The resulting mixture is allowed to warm to room temperature, at which point a precipitate appears; the resulting mixture is then heated to a temperature of about 70°–100° C. for a period of about 10 minutes. About 15 ml. of water is added slowly to the reaction mixture, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized to give 17α,21-dihydroxy-6α,16α-dimethyl-4,9(11)-pregnadiene-3,20-dione 21-acetate. A suspension of 330 mg. of 17α,21-dihydroxy-6α,16α-dimethyl-4,9(11)-pregnadiene-3,20-dione 21-acetate and 1.8 g. of N-bromosuccinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours during which time the solid material slowly dissolves. The resulting yellow solution is treated with 1.0 ml. of allyl alcohol to discharge the color and the remaining N-bromo-succinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-11β,17α,21-trihydroxy-6α,16α-dimethyl - 4 - pregnene-3,20-dione 21-acetate.

A solution of 210 mg. of 9α-bromo-11β-17α,21-trihydroxy-6α,16α-dimethyl-4-pregnene-3,20-dione 21-acetate and 240 mg. of potassium acetate in 10 ml. of absolute ethanol is heated under reflux for two hours. The reaction mixture is cooled to room temperature, evaporated in vacuo to a small volume, and diluted with water. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 9β,11β-epoxy-17α,21-dihydroxy-6α,16α-dimethyl - 4 - pregnene-3,20-dione 21-acetate.

To a solution of 83 mg. of anhydrous hydrogen fluoride in 4.7 ml. of ice-cold alcohol-free chloroform is added an ice-cold solution of 416 mg. of 9β,11β-epoxy-17α,21 - dihydroxy - 6α,16α - dimethyl-4-pregnene-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 9α-fluoro-11β,17α,21-trihydroxy-6α,16α-dimethyl - 4 - pregnene-3,20-dione 21-acetate. Fifty milligrams of 9α-fluoro-11β,17α,21 - trihydroxy - 6α,16α - dimethyl-4-pregnene-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 9α-fluoro-11β,17α,21-trihydroxy-6α,16α-dimethyl-3,20-dione.

Similarly, when hydrogen chloride is substituted for hydrogen fluoride in the reaction with 9β,11β-epoxy-17α,21-dihydroxy-6α,16α-dimethyl-4-pregnene-3,20-dione 21- acetate there is obtained the corresponding 9α-chloro-11β,17α - 21 - trihydroxy-6α,16α-dimethyl-4-pregnene-3,20-dione.

In accordance with the foregoing procedures when 11β,17α,21 - trihydroxy-6α,16β-dimethyl-4-pregnene-3,20-dione 21-acetate is employed as the starting material, there is obtained the corresponding 9α-fluoro-11β,17α,21-trihydroxy-6α,16β - dimethyl - 4 - pregnene-3,20-dione or 9α-chloro - 11β,17α,21 - trihydroxy - 6α,16β-dimethyl-4-pregnene-3,20-dione.

To a solution of 100 mg. of 9α-fluoro-11β,17α,21-trihydroxy-6α,16α-dimethyl-4-pregnene-3,20-dione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated, using partition chromatography on diatomaceous silica (supercel), to give 9α-fluoro-11β,17α,21 - trihydroxy-6α,16α-dimethyl-1,4-pregnadiene-3,20-dione 21-acetate.

This material is hydrolyzed using 1 N methanolic potassium hydroxide in benzene as described above for the hydrolysis of 9α-fluoro-11β,17α,21-trihydroxy-6α,16α-dimethyl-4-pregnene-3,20-dione 21-acetate to give 9α-fluoro-11β,17α,21 - trihydroxy-6α,16α-dimethyl-1,4-pregnadiene-3,20-dione.

Starting with 9α-chloro-11β-17α,21-trihydroxy-6α,16α-dimethyl-4-pregnene-3,20-dione 21-acetate, there are obtained in accordance with the foregoing procedures the corresponding 9α - chloro-11β,17α,21-trihydroxy-6α,16α-dimethyl-1,4-pregnadiene-3,20-dione, and its 21-acetate.

Similarly, starting with 9α-bromo-11β,17α,21-trihydroxy-6α,16α-dimethyl-4-pregnene-3,20-dione 21-acetate obtained as an intermediate in the preparation of 9α-fluoro-11β,17α,21-trihydroxy-6α,16α-dimethyl-4-pregnene-3,20-dione herein described above, there are obtained the corresponding 9α-bromo-11β,17α,21-trihydroxy-6α,16α-dimethyl-1,4-pregnadiene-3,20-dione, and its 21-acetate.

In accordance with the foregoing procedures, but starting with 9α-halo-11β,17α,21-trihydroxy-6α,16α-dimethyl-4-pregnene-3,20-dione 21-acetate there are obtained the corresponding 9α-halo-11β, 17α,21-trihydroxy-6α,16β-dimethyl-1,4-pregnadiene-3,20-diones such as for example 9α - fluoro - 11β,17α,21 - trihydroxy-6α,16β-dimethyl-1,4-pregnadiene-3,20-dione, 9α-chloro-11β,17α,21-trihydroxy-6α,16β - dimethyl - 1,4-pregnadiene-3,20-dione and 9α-bromo - 11β,17α,21-trihydroxy-6α,16β-dimethyl-1,4-pregnadiene-3,20-dione, and their 21-acetates.

A solution of 400 mg. of 9α-fluoro-11β,17α,21-trihydroxy-6α,16α-dimethyl-4-pregnene-3,20-dione 21-acetate in 4 ml. of pyridine is added to the complex formed by the addition of 400 mg. of chromium trioxide to a 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 9α-fluoro-17α,21-dihydroxy-6α, 16α-dimethyl-4-pregnene-3,11,20-trione 21-acetate. Fifty milligrams of 9α-fluoro-17α,21-dihydroxy-6α,16α-dimethyl-4-pregnene-3,11,20-trione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 9α-fluoro-17α,21dihydroxy-6α,16α-dimethyl-4-pregnene-3,11,20-trione.

Similarly, starting with 9α-chloro-11β,17α,21-trihydroxy-6α,16α-dimethyl-4-pregnene,3,20-dione 21-acetate, there are obtained in accordance with the foregoing procedures the corresponding 9α-chloro-17α,21-dihydroxy-6α, 16α-dimethyl-4-pregnene-3,11,20-trione, and its 21-acetate.

Similarly, but starting with 9α-bromo-11β,17α,21-trihydroxy - 6α,16α-dimethyl - 4 - pregnene - 3,20-dione 21 - acetate obtained as an intermediate in the preparation of 9α - fluoro - 11β,17α,21 - trihydroxy - 6α,16α-dimethyl - 4 - pregnene - 3,20 - dione herein described above, there are obtained the corresponding 9α - bromo-17α,21 - dihydroxy - 6α,16α - dimethyl - 4 - pregnene-3,11,20 - trione, and its 21-acetate.

In accordance with the foregoing procedures, but starting with 9α - halo - 11β,7α,21 - trihydroxy - 6α,16β-dimethyl - 4 - pregnene - 3,20 - dione 21 - acetate, there are obtained the corresponding 9α - halo - 17α,21-dihydroxy - 6α,16β - dimethyl - 4 - pregnene - 3,11,20-triones, such as for example, 9α - fluoro-17α,21-dihydroxy-6α, 16β - dimethyl - 4 - pregnene - 3,11,20-trione, 9α-chloro-17α,21 - dihydroxy - 6α,16β - dimethyl-4-pregnene-3,11, 20 - trione, and 9α - bromo-17α,21-dihydroxy-6α,16β-dimethyl - 4 - pregnene - 3,11,20-trione, and their 21-acetates.

To a solution of 100 mg. of 9α - fluoro-17α,21-dihydroxy - 6α,16α - dimethyl - 4 - pregnene-3,11,20-trione 21 - acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (supercel) to give 9α - fluoro - 17α,21-dihydroxy-6α,16α-dimethyl - 1,4 - pregnadiene - 3,11,20 - trione 21 - acetate. This material is hydrolyzed using 1 N methanolic potassium hydroxide in benzene as described hereinabove for the hydrolysis of 9α - fluoro - 17α,21-dihydroxy-6α,16α-dimethyl - 4 - pregnene - 3,11,20 - trione 21-acetate to give 9α - fluoro - 17α,21 - dihydroxy-6α,16α-dimethyl-1,4-pregnadiene-3,11,20-trione.

Similarly, starting with 9α-chloro-17α,21-dihydroxy-6α,16α - dimethyl - 4 - pregnene - 3,11,20-trione 21-acetate there are obtained in accordance with the foregoing procedures the corresponding 9α - chloro - 17α,21-dihydroxy - 6α - dimethyl - 1,4 - pregnadiene - 3,11,20-trione, and its 21-acetate.

Similarly, but starting with 9α - bromo - 17α,21-dihydroxy - 6α,16α - dimethyl - 4 - pregnene-3,11,20-trione 21 - acetate there are obtained the corresponding 9α-bromo - 17α,21 - dihydroxy - 6α,16α - dimethyl - 1,4-pregnadiene - 3,11,20 - trione, and its 21 - acetate.

In accordance with the foregoing procedures but starting with 9α - halo - 17α,21 - dihydroxy-6α,16β-dimethyl-4 - pregnene - 3,11,20 - trione 21-acetate there are obtained the corresponding 9α - halo - 17α,21 - dihydroxy-6α,16β - dimethyl - 1,4 - pregnadienes - 3,11,20-triones, such as for example, 9α - fluoro - 17α,21 - dihydroxy-6α,16β - dimethyl - 1,4-pregnadiene-3,11,20-trione, 9α-chloro - 17α,21 - dihydroxy - 6α,16β - dimethyl - 1,4-pregnadiene - 3,11,20 - trione and 9α - bromo - 17α,21-dihydroxy - 6α,16β - dimethyl - 1,4-pregnadiene - 3,11, 20-trione, and their 21 acetates.

A suspension containing 300 mg. of 17α,21-dihydroxy-6α,16α - dimethyl - 4 - pregnene - 3,11,20-trione 21-acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice-cold 10% aqueous sodium bisulfite solution, three 20 ml. portions of ice-cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords $17\alpha,21$ - dihydroxy - $6\alpha,16\alpha$ - dimethyl-4,6-pregnadiene-3,11,20 - trione 21 - acetate. This product is then hydrolyzed by treatment with a solution of potassium bicarbonate in aqueous methanol to form $17\alpha,21$ - dihydroxy - $6\alpha,16\alpha$ - dimethyl - 4,6-pregnadiene - 3,11,20-trione.

In accordance with the above procedure but starting with $17\alpha,21$ - dihydroxy - $6\alpha,16\beta$-dimethyl-4-pregnene-3,11,20 - trione 21 - acetate there are obtained $17\alpha,21$-dihydroxy - $6\alpha,16\beta$ - dimethyl - 4,6-pregnadiene-3,11,20-trione and its 21-acetate.

In accordance with the above procedure but starting with $11\beta,17\alpha,21$-trihydroxy-$6\alpha,16\alpha$-dimethyl-4-pregnene-3,20-dione 21-acetate there is obtained $11\beta,17\alpha,21$-trihydroxy-$6\alpha,16\alpha$-dimethyl-4,6-pregnadiene-3,20-dione and its 21-acetate.

In accordance with the above procedure but starting with $11\beta,17\alpha,21$-trihydroxy-$6\alpha,16\beta$-dimethyl-4-pregnene-3,20-dione 21-acetate there is obtained $11\beta,17\alpha,21$-trihydroxy-$6\alpha,6\beta$-dimethyl-4,6-pregnadiene-3,20-dione and its 21-acetate.

A suspension containing 300 mg. of $9\alpha$-fluoro-$11\beta,17\alpha,21$-trihydroxy-$6\alpha,16\alpha$-dimethyl-4 - pregnen-3,20-dione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice-cold 10% aqueous sodium bisulfite solution, three 20 ml. portions of ice-cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords $9\alpha$-fluoro-$11\beta,17\alpha,21$-trihydroxy-$6\alpha,16\alpha$-dimethyl-4,6 - pregnadiene - 3,20-dione 21-acetate. This product is then hydrolyzed by treatment with a solution of potassium bicarbonate in aqueous methanol to form $9\alpha$-fluoro-$11\beta,17\alpha,21$-trihydroxy-$6\alpha,16\alpha$-dimethyl-4,6-pregnadiene-3,20-dione.

In accordance with the above procedure but starting with $9\alpha$-chloro-$11\beta,17\alpha,21$ - trihydroxy-$6\alpha,16\alpha$-dimethyl-4-pregnene-3,20-dione 21-acetate, there are obtained the corresponding $9\alpha$-chloro-$11\beta,17\alpha,21$ - trihydroxy-$6\alpha,16\alpha$-dimethyl-4,6-pregnadiene-3,20-dione and its 21-acetate.

In accordance with the above procedure but starting with $9\alpha$-bromo-$11\beta,17\alpha,21$-trihydroxy-$6\alpha,16\alpha$-dimethyl-4-pregnene-3,20-dione 21-acetate, there are obtained the corresponding $9\alpha$-bromo - $11\beta,16\alpha,21$-trihydroxy-$6\alpha,16\alpha$-dimethyl-4,6-pregnadiene-3,20-dione and its 21-acetate.

Similarly, in accordance with the above procedure but starting with $9\alpha$-bromo-$11\beta,17\alpha,21$-trihydroxy-$6\alpha,16\beta$-dimethyl-4-pregnene-3,20-dione 21-acetate, there is obtained the corresponding $9\alpha$-fluoro - $11\beta,17\alpha,21$-trihydroxy-$6\alpha,16\alpha$-dimethyl-4,6-pregnadiene-3,20-dione and its 21-acetate.

Similarly, in accordance with the above procedure but starting with $9\alpha$-bromo-$11\beta,17\alpha,21$-trihydroxy-$6\alpha,16\beta$-dimethyl-4-pregnene-3,20-dione 21-acetate, there is obtained the corresponding $9\alpha$-chloro-$11\beta,17\alpha,21$-trihydroxy-$6\alpha,16\beta$-dimethyl-4,6-pregnadiene-3,20-dione and its 21-acetate.

Similarly, in accordance with the above procedure but 75 starting with $9\alpha$-bromo-$11\beta,17\alpha,21$-trihydroxy-$6\alpha,16\beta$-dimethyl-4-pregnene-3,20-dione 21-acetate, there is obtained the corresponding $9\alpha$-bromo-$11\beta,17\alpha,21$-trihydroxy-$6\alpha,16\beta$-dimethyl-4,6-pregnadiene-3,20-dione and its 21-acetate.

A suspension containing 300 mg. of $9\alpha$-fluoro-$17\alpha,21$-dihydroxy-$6\alpha,16\alpha$-dimethyl-4-pregnene-3,11,20-trione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice-cold 10% aqueous sodium bisulfite solution, three 20 ml. portions of ice-cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords $9\alpha$-fluoro-$17\alpha,21$-dihydroxy - $6\alpha,16\alpha$ - dimethyl-4,6-pregnadiene-3,11,20-trione 21-acetate. This product is then hydrolyzed by treatment with a solution of potassium bicarbonate in aqueous methanol to form $9\alpha$-fluoro-$17\alpha$,21-hydroxy-$6\alpha,16\alpha$-dimethyl - 4,6 - pregnadiene-3,11,20-trione.

In accordance with the above procedure but starting with $9\alpha$-chloro-$17\alpha$,21 - dihydroxy - $6\alpha,16\alpha$-dimethyl-4-pregnene-3,11,20-trione 21-acetate there is obtained the corresponding $9\alpha$-chloro-$17\alpha$,21-dihydroxy-$6\alpha,16\alpha$-dimethyl-4,6-pregnadiene-3,11,20-trione and its 21-acetate.

In accordance with the above procedure but starting with a $9\alpha$-bromo-$17\alpha$,21 - dihydroxy-$6\alpha,16\alpha$-dimethyl-4-pregnene-3,11,20-trione 21-acetate there is obtained the corresponding $9\alpha$-bromo-$17\alpha$,21 - dihydroxy-$6\alpha,16\alpha$-dimethyl-4,6-pregnadiene-3,11,20-trione and its 21-acetate.

Similarly, in accordance with the above procedure but starting with $9\alpha$-fluoro-$17\alpha$,21-dihydroxy-$6\alpha,16\beta$-dimethyl-5-pregnene-3,11,20-trione 21-acetate, there are obtained the corresponding $9\alpha$-fluoro-$17\alpha$,21-dihydroxy-$6\alpha,16\beta$-dimethyl-4,6-pregnadiene-3,11,20-trione and its 21-acetate.

Similarly, in accordance with the above procedure but starting with $9\alpha$-chloro-$17\alpha$,21-dihydroxy-$6\alpha,16\beta$-dimethyl-4-pregnene-3,11,20-trione 21-acetate, there are obtained the corresponding $9\alpha$-chloro-$17\alpha$,21-dihydroxy-$6\alpha,16\beta$-dimethyl-4,6-pregnadiene-3,11,20-trione and its 21-acetate.

Similarly, in according with the above procedure but starting with $9\alpha$-bromo-$17\alpha$,21-dihydroxy-$6\alpha,16\beta$-dimethyl-4-pregnene-3,11,20-trione 21-acetate, there are obtained the corresponding $9\alpha$-bromo-$17\alpha$,21-dihydroxy-$6\alpha,16\beta$-dimethyl-4,6-pregnadiene-3,11,20-trione and its 21-acetate.

To a solution of 200 mg. of $17\alpha$,21-dihydroxy-$6\alpha,6\alpha$-dimethyl-4,6-pregnadiene-3,11,20-trione 21-acetate in 0.6 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give $17\alpha$,21-dihydroxy-$6\alpha,16\alpha$-dimethyl-1,4,6 - pregnatriene-3,11,20-trione 21-acetate. This product is then hydrolyzed by treatment with a solution of potassium bicarbonate in aqueous methanol to form $17\alpha$,21-dihydroxy-$6\alpha,16\alpha$-dimethyl-1,4,6-pregnatriene-3,11,20-trione.

In accordance with the above procedure but starting with $17\alpha$,21-dihydroxy-$6\alpha,16\beta$-dimethyl-4,6 - pregnadiene-3,11,20-trione 21-acetate there are obtained $17\alpha$,21-dihydroxy-$6\alpha,16\beta$-dimethyl-1,4,6-pregnatriene-3,11,20 - trione and its 21-acetate.

Similarly, when $11\beta,17\alpha,21$-trihydroxy-$6\alpha,16\alpha$ - dimethyl-4,6-pregnadiene-3,20-dione 21-acetate is used as starting material in the foregoing reaction with selenium dioxide and the product hydrolyzed with aqueous methanolic potassium bicarbonate solution, there are obtained 11β,17α,21-trihydroxy-6α,16α - dimethyl - 1,4,6 - pregnatriene-3,20-dione and its 21-acetate. Where the starting material in this procedure is 11β,17α,21 - trihydroxy-6α,16β-dimethyl-4,6-pregnadiene-3,20-dione 21 - acetate, there are obtained 11β,17α,21-trihydroxy-6α,16β-dimethyl-1,4,6-pregnatriene-3,20-dione and its 21-acetate.

Where the starting material in the foregoing reaction with selenium dioxide followed by hydrolysis with aqueous methanolic potassium bicarbonate is 9α - fluoro-11β,17α,21-trihydroxy-6α,16α - dimethyl - 1,4,6 - pregnatriene-3,20-dione and its 21-acetate.

In accordance with the above procedure but starting with 9α-chloro-11β,17α,21-trihydroxy-6α,16α - dimethyl-4,6-pregnadiene-3,20-dione 21-acetate there are obtained 9α-chloro-11β,7α,21-trihydroxy-6α,16α - dimethyl - 1,4,6-pregnadiene-3,20-dione and its 21-acetate.

Similarly, in accordance with the above procedure but starting with 9α-bromo-11β,17α,21-trihydroxy-6α,16α - dimethyl-4,6-pregnadiene-3,20-dione 21-acetate there are obtained 9α-bromo-11β,17α,21-trihydroxy-6α,16α - dimethyl-1,4,6-pregnadiene-3,20-dione and its 21-acetate.

In accordance with the above procedure but starting with 9α-fluoro-11β,17α,21-trihydroxy-6α,16β - dimethyl-4,6-pregnadiene-3,20-dione 21-acetate there are obtained 9α-fluoro-11β,17α,21-trihydroxy-6α,16β - dimethyl - 1,4,6-pregnatriene-3,20-dione and its 21-acetate.

In accordance with the above procedure but starting with 9α-chloro-11β,17α,21-trihydroxy-6α,16β - dimethyl-4,6-pregnadiene-3,20-dione 21-acetate there are obtained 9α-chloro-11β,17α,21-trihydroxy-6α,16β-dimethyl - 1,4,6-pregnatriene-3,20-dione and its 21-acetate.

In accordance with the above procedure but starting with 9α-bromo-11β,17α,21-trihydroxy-6α,16β - dimethyl-4,6-pregnadiene-3,20-dione 21-acetate there are obtained 9α-bromo-11β,17α,21-trihydroxy-6α,16β-dimethyl - 1,4,6-pregnatriene-3,20-dione and its 21-acetate.

To a solution of 200 mg. of 9α-fluoro-17α,21-dihydroxy-6α,16α-dimethyl-4,6-pregnadiene - 3,11,20 - trione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluated with mixtures of chloroform and ether, increasingly rich in chloroform. The eluates are combined, evaporated to dryness and the residual material recrystallized from ethyl acetate to give 9α-fluoro-17α,21 - dihydroxy-6α,16α-dimethyl-1,4,6-pregnatriene - 3,11,20 - trione 21-acetate. This product is then hydrolyzed by treatment with a solution of potassium bicarbonate in aqueous methanol to form 9α-fluoro-17α,21-dihydroxy - 6α,16α - dimethyl-1,4,6-pregnatriene-3,11,20-trione.

In accordance with the above procedure but starting with 9α-chloro-17α,21-dihydroxy-6α,16α - dimethyl - 4,6-pregnadiene-3,11,20-trione 21-acetate there are obtained 9α-chloro-17α,21-dihydroxy - 6α,16α - dimethyl - 1,4,6-pregnatriene-3,11,20-trione and its 21-acetate.

Similarly, in accordance with the above procedure but starting with 9α-bromo-17α,21 - dihydroxy - 6α,16α - dimethyl-4,6-pregnadiene-3,11,20 - trione 21-acetate there are obtained 9α-bromo-17α,21-dihydroxy-6α,16α-dimethyl-1,4,6-pregnatriene-3,11,20-trione and its 21-acetate.

In accordance with the above procedure but starting with 9α-fluoro-16α,21-dihydroxy-6α,16β - dimethyl - 4,6-pregnadiene-3,11,20-trione 21-acetate there are obtained 9α-fluoro-17α,21-dihydroxy - 6α,16β - dimethyl - 1,4,6-pregnatriene-3,11,20-trione and its 21-acetate.

In accordance with the above procedure but starting with 9α-chloro-17α,21-dihydroxy-6α,16β - dimethyl - 4,6-pregnadene-3,11,20-trione 21-acetate there are obtained 9α-chloro-17α,21-dihydroxy - 6α,16β - dimethyl - 1,4,6,-pregnatriene-3,11,20-trione and its 21-acetate.

In accordance with the above procedure but starting with 9α - bromo - 17α,21 - dihydroxy-6,16β-dimethyl-4,6-pregnadiene-3,11,20-trione 21-acetate there are obtained 9α - bromo - 17α,21-dihydroxy-6,16β-dimethyl-1,4,6-pregnatriene-3,11,20-trione and its 21-acetate.

To a suspension of 25.0 g. of 11β,17α,21-trihydroxy-6α,16α-dimethyl-4,6-pregnadiene-3,20-dione in 1.5 l. of alcohol-free chloroform cooled to about 5° C. in an ice bath is added with constant stirring 750 ml. of cold, concentrated aqueous hydrochloric acid solution and then 750 ml. of Formalin (low in methanol). The mixture is removed from the ice bath and stirred at room temperature for approximately 7 hours. The layers are separated and the aqueous phase is back-extracted twice with chloroform. The combined chloroform layers are washed twice with a 5% aqueous solution of sodium bicarbonate, and twice with a saturated aqueous solution of sodium chloride. The washed chloroform solution is dried over magnesium sulfate and evaporated under reduced pressure. The residual material is triturated with methanol to give a crystalline solid, which is recrystallized from a mixture of benzene and n-hexane to give 17α,20,20,21-bismethylenedioxy-11β, hydroxy-6α,16α-dimethyl-4,6-pregnadiene-3-one.

A solution of 400 mg. of 17α,20,20,21-bismethylenedioxy - 11β - hydroxy-6α,16α-dimethyl-4,6-pregnadiene-3-one in 4 ml. of pyridine is added to the complex formed by the addition of 400 mg. of chromium trioxide to 4 ml. of pyridine. The mixture is swirled until thoroughly mixed and then allowed to stand at room temperature for a period of about 15 hours. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 17α,20,20,21-bismethylenedioxy - 6α,16α - dimethyl - 4,6 - pregnadiene-3,11-dione.

Approximately 1.35 g. of 17α,20,20,21-bismethylenedioxy-6α,16α-dimethyl-4,6-pregnadiene-3,11-dione is dissolved in 23 ml. of dry, hot benzene, the resulting solution is cooled to room temperature, and to the solution is added 0.96 ml. of freshly-distilled ethyl formate. The air in the system is replaced with nitrogen and 560 mg. of sodium hydride (as a 58% dispersion in mineral oil) is added. The system is again evacuated and filled with nitrogen, and the mixture is stirred at room temperature for a period of about 15 hours. The reaction mixture is poured into an excess of a saturated aqueous solution of sodium dihydrogen phosphate, and the resulting aqueous mixture is extracted four times with benzene. The benzene reaction solution and extracts are combined, washed three times with water, dried over sodium sulfate, and evaporated to dryness. The residual material is dissolved in ether, and the ether solution is extracted with a 10% aqueous solution of sodium carbonate. The aqueous alkaline extracts are acidified with an excess of a saturated aqueous solution of sodium dihydrogen phosphate, and the aqueous acidic mixture extracted with ether and then with chloroform. The combined organic extracts are dried over sodium sulfate, and evaporated to dryness to give 17α,20,20,21 - bismethylenedioxy - 2 - hydroxymethylene-6α,16α-dimethyl-4,6-pregnadiene-3,11-dione.

Approximately 850 mg. of 17α,20,20,21-bismethylenedioxy - 2 - hydroxymethylene-6,16-dimethyl-4,6-pregnadiene-3,11-dione is dissolved in 9.2 ml. of absolute ethanol, and to the solution is added a solution of 0.16 ml. of hydrazine hydrate dissolved in 0.16 ml. of absolute ethanol. The resulting mixture is heated under reflux in a nitrogen atmosphere for a period of about 45 minutes, and the reaction mixture is then evaporated to dryness under reduced pressure. The residual material is washed with three portions of cold water, and the resulting amorphous solid is dried at a temperature of about 80° C. for 1 hour in high vacuum to give 17α,20,20,21-bismethylenedioxy-6α,16α-dimethyl-[3,2-c]pyrazole-4,6-pregnadiene-11-one.

To a solution of 100 mg. of 17α,20,20,21-bismethylenedioxy - 6α,16α-dimethyl-[3,2-c]pyrazolo-4,6-pregnadiene-11-one in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, with ice-cold 1 N sulfuric acid (until the pH of the aqueous layer is 1–3), with saturated aqueous sodium bicarbonate solution (until the pH of the aqueous layer is 8), and with water (until the aqueous layer is neutral). The ethyl acetate solution is then dried with anhydrous sodium sulfate, and the solvent is distilled at a temperature of about 40° C., in vacuo to give 1' - acetyl - 17α,20,20,21-bismethylenedioxy-6α,16α-dimethyl - [3,2-c]pyrazolo-4,6-pregnadiene-11-one, which is isolated by the addition of water and filtration.

In accordance with the above procedure, but using an equivalent quantity of another acylating agent in place of the acetic anhydride, there is obtained the corresponding 1'-acyl derivative.

Approximately 720 mg. of 1'-acetyl-17α,20,20,21-bismethylene dioxy - 6α,16α - dimethyl - [3,2-c]pyrazolo-4,6-pregnadiene-11-one is heated on a steam bath with 24 ml. of a 60% aqueous solution of formic acid for a period of about 30 minutes. The excess reagent is removed in vacuo using a water bath at a temperature of about 50° C. as the source of heat. The residual material is flushed four times with n-hexane, and dried at 60° C. in high vacuum. The amorphous solid thus obtained is dissolved in about 3.4 ml. of pure methanol and allowed to react with 1.3 ml. of a 1.33 N solution of sodium methoxide in methanol at room temperature under a nitrogen atmosphere for ten minutes. The excess sodium methoxide is neutralized with acetic acid, and the mixture is then evaporated to dryness and flushed with n-hexane. The residual material is washed with water, filtered and dried to give 17α,21-dihydroxy - 6,16α - dimethyl - [3,2-c]pyrazolo - 4,6 - pregnadiene-11,20-dione.

In accordance with the above procedures, but starting with the 1β,17α,21 - trihydroxy - 6α,16β - dimethyl - 4,6 - pregnadiene-3,20-dione in place of the 11β,17α,21-trihydroxy - 6α,16α - dimethyl - 4,6 - pregnadiene - 3,20 - dione, there is obtained as produce the corresponding 17α,21-dihydroxy - 6α,16β - dimethyl - [3,2-c]pyrazolo - 4,6 - pregnadiene-11,20-dione.

In accordance with the above procedures, but starting with 11β,17α,21 - trihydroxy - 6α,16α - dimethyl - 9α - fluoro-4,6-pregnadiene-3,20-dione in place of the 11β,17α,21-trihydroxy-6α,16α - dimethyl - 4,6 - pregnadiene - 3,20 - dione, there is obtained as product, via the intermediate formation of 1-acetyl-17α,20,20,21-bismethylenedioxy-6α,16α - dimethyl - 9α - fluoro - [3,2-c]pyrazolo - 4,6 - pregnadiene-11-one, the corresponding 17α,21 - dihydroxy-6α,16α - dimethyl - 9α - fluoro - [3,2-c]pyrazolo - 4,6 - pregnadiene - 11,20 - dione. Alternatively, the intermediate 1' - acetyl - 17α,20,20,21 - bismethylenedioxy - 6α,16α - dimethyl - 9α - fluoro - [3,2-c]pyrazolo - 4,6 - pregnadiene - 11-one is reacted with sodium borohydride to form 1'-acetyl - 17α,20,20,21 - bismethylenedioxy - 6α,16α - dimethyl - 9α - fluoro - [3,2-c]pyrazolo - 4,6 - pregnadiene - 11β-ol which is then reacted with 60% aqueous formic acid and the resulting amorphous solid reacted with dilute methanolic sodium methoxide as described hereinabove in this example, thereby forming 11β,17α,21-trihydroxy-6α,16α - dimethyl - 9α - fluoro - [3,2-c]pyrazolo - 4,6 - pregnadiene-20-one.

Approximately 1.35 g. of 17α,20,20,21 - bismethylenedioxy - 11β - hydroxy - 6α,16α - dimethyl - 4,6 - pregnadiene-3-one (which can be prepared as described hereinabove in this example) is dissolved in 23 ml. of dry, hot benzene, the resulting solution is cooled to room temperature, and to the solution is added 0.96 ml. of freshly-distilled ethyl formate. The air in the system is replaced with nitrogen and 560 mg. of sodium hydride (as a 58% dispersion in mineral oil) is added. The system is again evacuated and filled with nitrogen, and the mixture is stirred at room temperature for a period of about 15 hours. The mixture is poured into an excess of a saturated aqueous solution of sodium dihydrogen phosphate, and the resulting aqueous mixture is extracted four times with benzene. The benzene reaction solution and extracts are combined, washed three times with water, dried over sodium sulfate, and evaporated to dryness. The residual material is dissolved in ether, and the ether solution is extracted with a 10% aqueous solution of sodium carbonate. The aqueous alkaline extracts are acidified with an excess of a saturated aqueous solution of sodium dihydrogen phosphate, and the aqueous acidic mixture extracted with ether and then with chloroform. The combined organic extracts are dried over sodium sulfate, and evaporated to dryness to give 17α,20,20,21-bisemethylene - dimethyl - [3,2-c]pyrazolo - 4,6-pregnadiene-11β-ol which is isolated by the addition of water and filtration.

In accordance with the above procedure, but using an equivalent quantity of another acylating agent in place of acetic anhydride there is obtained the corresponding 1'-acyl-steroid.

Approximately 720 mg. of 1'-acetyl-17β-20,20,21-bismethylenedioxy - 6,16α - dimethyl-[3,2-c]pyrazolo - 4,6 - pregnadiene-11β-ol is heated on a steam bath with 24 ml. of a 60% aqueous solution of formic acid for a period of about 30 minutes. The excess reagent is removed in vacuo using a water bath at a temperature of about 50° C as the source of heat. The residual material is flushed four times with n-hexane, and dried at 60° C. in high vacuum. The amorphous solid thus obtained is dissolved in about 3.4 ml. of pure methanol and allowed to react with 1.3 ml. of a 1.33 N solution of sodium methoxide in methanol at room temperature under a nitrogen atmosphere for ten minutes. The excess sodium methoxide is neutralized with acetic acid, and the mixture is then evaporated to dryness and flushed with n-hexane. The residual material is washed with water, filtered and dried to give 11β,17α,21-trihydroxy - 6,16α - dimethyl - [3,2-c]pyrazolo - 4,6 - pregnadiene-20-one.

Approximately 0.5 g. of 17α,20,20,21 - bisemethylenedioxy - 11β - hydroxy - 6,16α - dimethyl - 4,6 - pregnadiene-3-one is dissolved in 25 cc. of benzene, and about 5 cc. of benzene is removed from the solution by distillation at normal pressure. The resulting solution is cooled to room temperature, and to the solution is added about 0.75 cc. of freshly-distilled ethyl formate. The air in the system is replaced with nitrogen, and about 150 mg. of sodium hydride (as a 57% dispersion in mineral oil) is added. The mixture is stirred under nitrogen at room temperature for a period of about three hours. About 15 cc. of a saturated aqueous solution sodium dihydrogen phosphate is added to the reaction mixture and the resulting aqueous mixture is extracted with ether. The benzene solution and ether extracts are combined, extracted with 2 N aqueous sodium hydroxide, and the aqueous sodium hydroxide extracts are acidified with sodium dihydrogen phosphate. The aqueous acidified solution is extracted with ether, the ether extract is evaporated to dryness, and the residual material is crystallized from ether to give 17, 20, 20,21-bismethylenedioxy - 11β - formyloxy - 2 - hydroxymethylene-6,16α-dimethyl-4,6-pregnadiene-3-one. Evaporation of the ether mother liquor, followed by recrystallization of the residual material from ether gives substantially pure 17α,20,20,21 - bismethylenedioxy - 11β - hydroxy - 2 - hydroxymethylene - 6,16α - dimethyl - 4,6 - pregnadiene - 3-one; M.P. 200–204° C.

Approximately 1.19 g. of 17α,20,20,21-bismethylenedioxy-11β-hydroxy - 2 - hydroxymethylene-6,16α-dimethyl-4,6-pregnadiene-3-one is dissolved in 25 cc. of ethanol. Three hundred mg. of phenyl hydrazine is added, and the mixture is heated under reflux in a nitrogen atmosphere for one hour. About 25 cc. of water is added. The product is then extracted into 150 cc. of ether. The ether extracts are washed with 2 N aqueous HCl, with saturated sodium bicarbonate, with water, with saturated aqueous sodium chloride solution, and then dried over anhydrous sodium sulfate. The washed and dried ether extracts are evaporated to dryness and the residual material is crystallized from ether to give 17α,20,20,21-bismethylenedioxy-6,16α-dimethyl-2′-phenyl-[3,2-c]pyrazolo - 4,6 - pregnadiene-11β-ol; M.P. 258–262° C.

Approximately 430 mg. of 17α,20,20,21-bismethylenedioxy-6,16α-dimethyl - 2′ - phenyl-[3,2-c]pyrazolo - 4,6-pregnadiene-11β-ol is heated on a steam bath under nitrogen with 40 cc. of a 60% aqueous solution of formic acid for a period of about 30 minutes. About 40 cc. of water is added to the reaction mixture, and the mixture is then extracted into about 200 cc. of chloroform. The chloroform solution is washed with water, with saturated aqueous sodium bicarbonate solution, again with water, and is then dried over anhydrous sodium sulfate. The washed and dried chloroform solution is evaporated under vacuum and the residual product is dissolved in 60 cc. of absolute methanol, and 0.1 equivalent of sodium methoxide in methanol is added. The resulting mixture is stirred under nitrogen at room temperature for 15 minutes. The reaction mixture is acidified with acetic acid, and the solvent is evaporated under vacuum at room temperature. About 20 cc. of water is added to the residual material, and the aqueous mixture is extracted with about 150 cc. of ethyl acetate. The ethyl acetate solution is washed with saturated aqueous sodium bicarbonate solution, with water, and is then dried over anhydrous sodium sulfate and evaporated to dryness to give an amorphous solid. This amorphous solid is dried in a high vacuum, and is then dissolved in 4 cc. of pyridine. About 3 cc. of acetic anhydride is added. The resulting mixture is heated on the steam bath for about 15 minutes and evaporated to dryness in vacuo. About 20 cc. of water is added. The aqueous mixture is then extracted with about 150 cc. of ethyl acetate, the ethyl acetate extract is washed with saturated aqueous sodium bicarbonate solution, and with water, and is then dried over anhydrous sodium sulfate. The washed and dried ethyl acetate solution is evaporated in vacuo, and the residual material is crystallized from ethyl acetate-benzene to give substantially pure 11β,17α,21-trihydroxy-6,16α-dimethyl - 2′ - phenyl-[3,2-c]pyrazolo - 4,6-pregnadiene-20-one 21-acetate; M.P. 225–226° C.

One hundred mg. of 11β,17α,21-trihydroxy-6,16α-dimethyl-2′-phenyl-[3,2-c]pyrazolo - 4,6 - pregnadiene-20-one 21-acetate is dissolved in 10 cc. of absolute methanol, and 1.1 equivalents of sodium methoxide in methanol is added. The mixture is stirred at room temperature under nitrogen for 15 minutes. The product is acidified with acetic acid and is then evaporated at room temperature under vacuum. The residual material is dissolved in 100 cc. of chloroform, the chloroform solution is washed with water, with saturated aqueous sodium bicarbonate solution, again with water, and is then dried over anhydrous sodium sulfate. The washed and dried chloroform solution is evaporated to dryness to give 11β,17α,21-trihydroxy-6,16α-dimethyl - 2′ - phenyl-[3,2-c]pyrazolo-4,6-pregnadiene-20-one.

The 16-mono-N-acetylamido-2-deoxy-glucosides and galactosides of this invention are prepared from the corresponding 16-hydroxy-21-acylates such as the 21-acetate. The monoacetate is prepared as follows: a mixture of the 16,21-diacetate and the 21-monoacetate prepared by treating the steroid substrate, for example, 9α-fluoro-11β,16α,17α,21-tetrahydroxy-1,4-pregnadiene-3,20-dione with 1.1 to 1.2 molar equivalents of acetic anhydride in pyridine is extracted with an excess of 0.1 M aqueous sodium-tetraborate. The diacetate is insoluble. The 21-monoacetate dissolves in the alkaline solution and precipitates on standing at room temperature after adjusting the pH to 1.2–2.0 with concentrated hydrochloric acid.

What is claimed is:
1. A compound selected from the group which consists of 2′-deoxy-glucosides and 2′-deoxy-galactosides having a 2′-position substituent selected from the group consisting of amino, alkanoylamino, trifluoroacetamido and orthoacetoxybenzoyl-amido substituents of the following hydroxylated anti-inflammatory compounds: Ring A unsaturated 11,17-bis-oxygenated-20-keto-steroids of the pregnane series having a hydroxyl radical in at least one of the 16 and 20 positions; hydroxybutazolidine; salicylic acid and hydrocarbonoxy esters thereof in which the hydrocarbonoxy group contains up to nine carbon atoms; salicylamide; N-alkyl-salicylamid; N,N-dialkyl-salicylamid; and substitution products of the foregoing salicylic acid compounds in which the phenyl nucleus contains a substituent selected from the group consisting of lower alkyl, halo, halophenyl, lower alkoxy and lower aralkoxy.

2. A compound of claim 1 in which the hydroxylated anti-inflammatory compound is 11β,17α-dihydroxy-1,4-pregnadiene-3,20-dione and the 2′-alkanoylamido group is acetamido.

3. A compound of claim 1 in which the hydroxylated anti-inflammatory compound is 9α-fluoro-16β-methyl-11β,17α-dihydroxy-1,4-pregnadiene-3,20-dione and the 2′-alkanoylamido group is acetamido.

4. A compound of claim 1 in which the hydroxylated anti-inflammatory compound is ortho-carbomethoxy phenol, the 2′ alkanoylamido group is acetamido and the glucoside is substituted at the 3′-, 4′- and 6′-positions with acetyl groups.

5. A compound of claim 1 in which the hydroxylated anti-inflammatory compound is ortho-carbomethoxy phenol, the 2′-alkanoylamido group is acetamido and the glucoside is substituted at the 3′-, 4′- and 6′-positions with ortho-acetoxybenzoyl groups.

6. A 2′-(ortho-acetoxybenzoylamido) compound of claim 1 in which the hydroxylated anti-inflammatory compound is ortho-carbomethoxy phenol and the glucoside is substituted at the 3′-, 4′-, and 6′-positions with ortho-acetoxybenzoyl groups.

7. 2 - trifluoroacetamido - 3,4,6-tri - O-acetyl-1-bromo-2-deoxy-α-D-glucoside and galactoside.

8. A glucoside compound of claim 7.

9. A galactoside compound of claim 7.

10. A process for the preparation of (ortho-carbo-lower alkoxy-phenyl) 2′-acetamido-3′,4′,6′-tri-O-(ortho-acetoxybenzoyl)-2′-deoxy-β-D-glucosides and galactosides which comprise:

(1) reacting a 2′-acetoxyamido 3,4,6-tri-O-acylated-1-halo-2-deoxy-α-D-glucose or galactose with an alkali metal salt of lower alkyl salicylate,
(2) hydrolyzing resulting compound in the presence of an alkali metal lower alkoxide, and
(3) reacting resulting compound with at least three equivalents of an acetoxy salicyloyl halide.

11. A process for the preparation of (ortho-carbo-lower alkoxy-phenyl)-2′-(ortho-acetoxybenzoylamido)-3′,4′,6′-tri-O-(ortho-acetoxybenzoyl) - 2′ - deoxy-β-D-glucosides and galactosides which comprises:

(1) reacting a 2′-trifluoroacetamido-3,4,6-tri-O-acylated-1-halo-2-deoxy-α-D-glucose or galactose with an alkali metal salt of a lower alkyl salicylate;
(2) hydrolyzing resulting compound in the presence of an alkali metal hydroxide;
(3) reacting resulting compound with a silver salt in the presence of ammonia;
(4) reacting resulting compound with a lower alkyl halide; and
(5) reacting resulting compound with at least four equivalents of acetoxy salicyloyl halide.

12. A compound as defined in claim 1 having the chemical name 11β,17α-dihydroxy-3,20-dione-1,4-pregnadiene-21-yl-β-D-2′-acetamido-2′-deoxy-glucoside.

13. A compound as defined in claim 1 having the chemical name 16α - methyl-11β-,17α-dihydroxy-3,20-dione-1,4-pregnadiene-21-yl-β-D-2′-acetamido-2′-deoxy-glucoside.

14. A compound as defined in claim 1 having the chemical name 9α-fluoro-6α,16α-dimethyl-11β,17α-dihydroxy-3,20-dione-1,4-pregnadiene-21-yl-β-D-2′-acetamido-2′-deoxy-glucoside.

15. A compound as defined in claim 1 having the chemical name 9α-fluoro-16β,17α-dihydroxy-3,20-dione-1,4-pregnadiene-21-yl-β-D-2′-acetamido-2′-deoxy-glucoside.

16. A compound as defined in claim 1 having the chemical name 6α-methyl-11β,17α-dihydroxy-3,20-dione-1,4-pregnadiene-21-yl-β-D-2′-acetamido-2′-deoxy-glucoside.

17. A compound as defined in claim 1 having the chemical name 6a-fluoro-11β,17α-dihydroxy-3,20-dione-1,4-pregnadiene-21-yl-β-D-2′-acetamido-2′-deoxy-glucoside.

18. A compound as defined in claim 1 having the chemical name 6,16α-dimethyl-11β,17α-dihydroxy-3,20-dione-4,6-pregnadiene-21-yl-β-D-2′-acetamido-2′-deoxy-glucoside.

19. A compound as defined in claim 1 selected from the group consisting of 9α-fluoro-11β,16α,17α-trihydroxy-3,20-dione-1,4-pregnadiene-21-yl-β-D-2′-acetamido-2′-deoxy-glucoside and the 16,17-acetonide thereof.

20. A compound as defined in claim 1 having the chemical name 6,16α-dimethyl-11β,17α-dihydroxy-[3,2-c]-pyrazolo-4,6-pregnadiene-20-one-21-yl-β-D-2′-acetamido-2′-deoxy-glucoside.

21. A compound as defined in claim 1 having the chemical name 11β,17a-dihydroxy-2′-phenyl-[3,2-c]-pyrazolo-4-pregnene-20-one-21-yl-β-D-2′-acetamido-2′-deoxy-glucoside.

References Cited

UNITED STATES PATENTS 3,152,115  10/1964  Morel et al. _____ 260—211
3,253,990  5/1966   Suter _____ 260—211

LEWIS GOTTS, Primary Examiner.

J. R. BROWN, Assistant Examiner.

U.S. Cl. X.R.

260—209, 210.5, 211, 239.5, 239.55, 397.45, 999